(12) United States Patent
Cottrell et al.

(10) Patent No.: US 6,813,056 B2
(45) Date of Patent: Nov. 2, 2004

(54) HIGH AMPLITUDE FAST OPTICAL MODULATOR

(75) Inventors: William J. Cottrell, Essex Junction, VT (US); Thomas G. Ference, Essex Junction, VT (US); Kenneth A. Puzey, Essex Junction, VT (US)

(73) Assignee: TeraComm Research inc., Essex Junction, VT (US)

( * ) Notice: Subject to any disclaimer, the term of this patent is extended or adjusted under 35 U.S.C. 154(b) by 326 days.

(21) Appl. No.: 09/796,025

(22) Filed: Feb. 28, 2001

(65) Prior Publication Data

US 2002/0118903 A1 Aug. 29, 2002

(51) Int. Cl.$^7$ ............................. G02B 1/09; G02F 1/00
(52) U.S. Cl. ...................... 359/280; 359/281; 359/237; 359/245
(58) Field of Search .............................. 385/1–3, 6, 11; 359/341.1, 280, 281, 237, 245; 356/345; 250/227.27, 227.19; 324/96; 428/692, 700

(56) References Cited

U.S. PATENT DOCUMENTS

| | | | |
|---|---|---|---|
| 5,502,585 A | 3/1996 | Qian | 359/108 |
| 5,768,002 A | 6/1998 | Puzey | 359/245 |
| 5,889,609 A | 3/1999 | Fukushima | 359/280 |
| 6,043,515 A | 3/2000 | Kamiguchi et al. | 257/103 |
| 6,476,956 B1 * | 11/2002 | Cottrell et al. | 359/280 |

OTHER PUBLICATIONS

Roman Sobolewski et al, "Magneto–Optical Modulator for Superconducting Digital Output Interface," paper presented at the Applied Superconducting Conference, Sep. 17–22, 2000.

J. J. Baumberg et al, "Femtosecond Faraday rotation in spin–engineered heterostructures," J. Appl. Phys. 75 (10), May 15, 1994.

K. K. Likharev and V. K. Semenov, "RSFQ Logic/Memory Family: A New Josephson–Junction Technology for Sub-–Terahertz–Clock–Frequency Digital Systems," IEEE Transactions on Applied Superconductivity, vol. 1, No. 1, Mar. 1991.

CRC Handbook of Chemistry and Physics, 80$^{th}$ edition, pp. 12–161 to 12–167, no date.

Bahaa E. A. Saleh et al, *Fundamentals of Phonotonics*, John Wiley & Sons, 1991.

Anthony E. Siegman, *Lasers*, University Science Books, Mill Valley California, 1986.

* cited by examiner

Primary Examiner—Ricky Mack

(57) ABSTRACT

A short intense pulse of radiation is generated by shining radiation through a magneto-optical material and providing multiple stimulations to the material. The material is excited multiple times to rapidly change a property of the radiation, such as the angle of its polarization. The first excitation rotates the polarization in a first direction and the second excitation can rotate the polarization further. Alternatively the second excitation can bring the polarization back to its initial direction. Effect of lengthy relaxation times in the material cancel each other out and the pulse of light has a length that depends on the time difference between the two excitations and the spacing between them. This allows a pulse of light to be produced that has more rotation or has a shorter pulse width than the time for excitation plus the time for normal relaxation of the magneto-optical material.

63 Claims, 16 Drawing Sheets

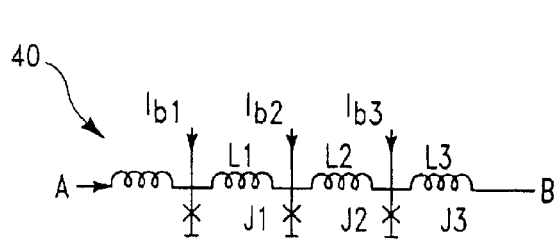
FIG. 6a (Prior Art)
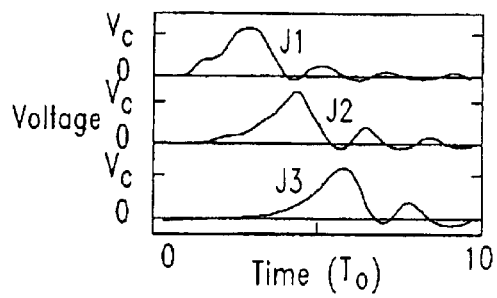
FIG. 6b (Prior Art)
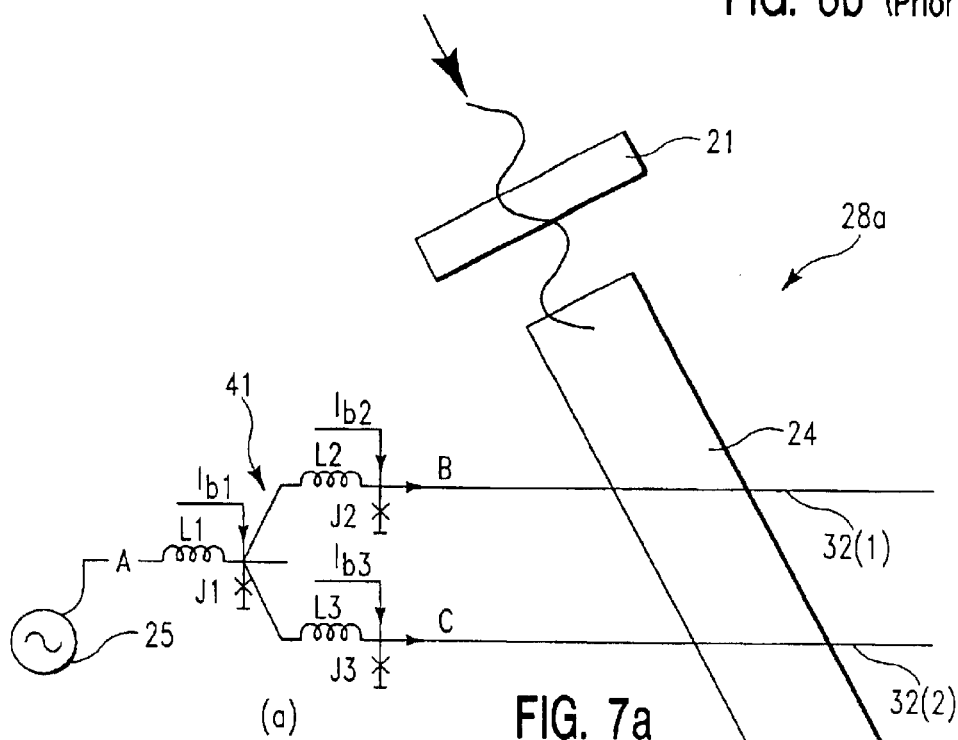
FIG. 7a
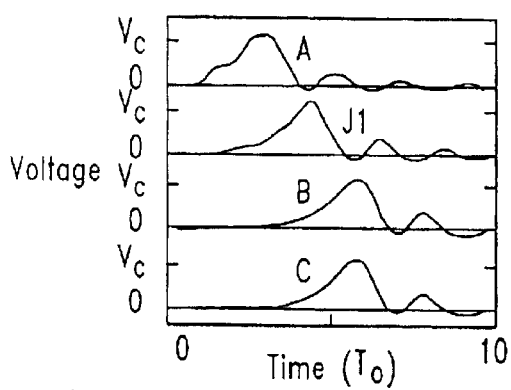
FIG. 7b
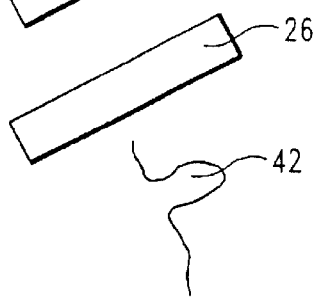

HIGH AMPLITUDE FAST OPTICAL MODULATOR

FIELD OF THE INVENTION

This invention generally relates to optical modulation. More particularly, it relates to a device for high data rate modulation of an optical signal. Even more particularly, the invention relates to a device that provides a high amplitude and high data rate of magneto-optical modulation.

BACKGROUND OF THE INVENTION

Because of the high data rates available, optical fiber is preferred for high-speed transmission of data, audio, and video. Binary optical signals consist of low and high intensity signals traveling through the fiber. The limiting factor has been the speed at which light can be electrically switched or modulated to provide change from high intensity signal to low intensity signal and back to high intensity signal. This conversion from electrical to optical is slower than the capability of the fiber. While the optical fiber can accommodate much higher data rates, commercial techniques for creating high-speed modulation are presently achieving approximately 40 billion bits per second, or 40 GHz.

One method provides a digital optical signal directly from a light source. In this method signal is directly modulated by turning on and turning off power to a laser source of light, but it is difficult to make these transitions quickly without introducing non-linear effects which degrade the signal. These effects include changes in index of refraction of material in the laser cavity which effectively changes the optical path length of the cavity during the pulse, leading to an effect called chirp, and provides greater dispersion of the signal as it travels down optical fiber.

Alternatively, a continuous wave light source can be externally modulated to create a desired digital optical signal. One method is electroabsorption modulation. Continuous wave light is directed through a semiconductor. When current flows in the semiconductor, enough electrons are moved from valence to conduction band to provide a population inversion. Light traveling through the semiconductor with the population inversion is amplified by stimulated emission. On the other hand, when no electric current flows, electrons move back to the valence band. Now the light is absorbed, so the light intensity is diminished as it travels through the semiconductor. The substantial difference in light intensity when current is flowing and when current is not flowing provides the on- and off-signals. However, this scheme is limited by the time for generation and relaxation of excited states in the semiconductor.

A third method, a Mach-Zehnder modulator, provides another external modulation technique in which a light beam traveling in a waveguide is split into two paths and then recombined into a single path where the two beams interfere. A material is provided along one path that has an index sensitive to applied voltage. The change in phase introduced by the changing voltage applied to the material provides for constructive or destructive interference where the signals recombine. Currently, however, 10–15V is needed to provide the phase shift, and a problem has been to make high frequency signals at a high voltage to drive the phase modulator.

An alternative approach to increase the amount of data that can be transmitted through an optical fiber is Dense Wave Division Multiplexing (DWDM), in which many individual signals, each with a slightly different wavelength, are transmitted through a single optical fiber at one time. Each of the dozens of signals in the fiber runs at the 40 GHz data rate, providing a substantially higher overall data rate. While DWDM increases the data rate provided by a fiber, the equipment cost for transmission capacity is higher providing additional wavelengths than is the cost by providing a faster modulation with a single wavelength. Also, errors may be introduced into the data as a result of a process known as four wave mixing, in which photons of different wavelengths in a fiber combine, so data is lost in two channels in the fiber. Two other photons are generated at different wavelengths, and these may contribute to noise and errors in other channels in the fiber. Thus, faster modulation for each wavelength is desirable.

Two additional techniques to greatly increase modulation frequency to increase the data rate for a wave in a fiber have been proposed in commonly assigned U.S. Pat. No. 5,768,002 to K. A. Puzey, and in a paper "Magneto-Optical Modulator for Superconducting Digital Output Interface," by Roman Sobolewski, et al, given at the Applied Superconducting Conference held Sep. 17–22, 2000 ("the Sobolewski paper"). Superconductors allow low voltage high-speed current switching.

The Puzey technique rapidly switches a superconducting film between superconducting and non-superconducting states and takes advantage of the difference in optical properties of the material in the two states. In the superconducting state more far infrared light is reflected from the material, while in the non-superconducting state, more is transmitted. Continuous far-infrared light is modulated by an electrical signal provided to such a superconducting film. After modulation of this far-infrared light, the signal is then parametrically converted to a shorter wavelength in the near-infrared range for transmission in a standard optical fiber. Well known frequency up-conversion nonlinear optics are used for the conversion.

The technique described in the Sobolewski paper stimulates magneto-optic material 10, such as europium monochalcogenides (EuS, EuTe, EuO, and EuSe) by providing magnetic field 12 from current pulse 14 in adjacent superconducting signal electrode 16 driven by a Josephson junction, as shown in FIGS. 1a, 1b. Continuous light wave 18 is coupled into magneto-optic material 10 through fiber optic input 19a and exits through fiber optic output 19a. Portion of light wave 18 traveling in magneto-optical material 10 in magnetic field 12 has its polarization rotated, a property known as the Faraday effect. An interferometer is used to provide pulses of light based on this rotation of the polarization. Because the excitation of magneto-optical materials occurs in a time measured in pico-seconds, as shown in FIG. 2a from a paper, "Femtosecond Faraday rotation in spin-engineered heterostructures," by J. J. Baumberg, et al, J. Appl. Phys. 75 (10), May 15, 1994 ("the Baumberg paper"), early investigators recognized that such microstriplines might provide a way to modulate signals in the THz (trillion bits per second) range, about two orders of magnitude higher than present modulation. While the Sobolewski paper discloses high speed magneto-optic modulation it is limited to small rotations (4.52°). A 4.52° rotation limits throughput to 0.6%.

Although a number of authors have suggested advantages to modulating light based on magneto-optical materials, none suggests a scheme that provides large rotations of the polarization at a high data rate. Thus, a better system for converting an electrical signal to an optical signal is needed that provides short pulses having high amplitude, and this solution is provided by the following invention.

SUMMARY OF THE INVENTION

It is therefore an object of the present invention to provide a method of increasing power of an optical signal provided from a magneto-optical system;

It is a further object of the present invention to provide a method of increasing polarization rotation of an optical signal provided from a magneto-optical material;

It is a further object of the present invention to provide a scheme for rapidly rotating polarization of an optical signal while eliminating a slow relaxation of the polarization;

It is a further object of the present invention to provide a scheme for increasing polarization rotation and rapidly rotating polarization while eliminating a slow relaxation of the polarization;

It is a further object of the present invention to provide a scheme for rapidly modulating power of an optical signal;

It is a further object of the present invention to provide a high power optical signal generated by a magneto-optical system while delay associated with relaxation from an excited state of the magneto-optical material does not affect data rate;

It is a further object of the present invention to provide modulation at a short wavelength and to transform the modulated wave to a longer wavelength for transmission in an optical fiber.

It is a further object of the present invention to provide amplification of a modulated optical signal using an optical amplifier;

It is a further object of the present invention to provide absorption of an off-signal while allowing transmission of a portion of an on-signal to improve on-signal to off-signal ratio;

It is a feature of the present invention that multiple rotations of the plane of polarization of light are provided by stimulating the magneto-optical material multiple times;

It is a feature of the present invention that pairs of oppositely directed rotations of the plane of polarization of light are provided by stimulating the magneto-optical material with a single current pulse crossing the material twice;

It is a feature of the present invention that a superconductor is used to couple a current pulse stimulation to the magneto-optical material;

It is an advantage of the present invention that a narrow high amplitude pulse is generated; and It is an advantage of the present invention that the optical modulating is at a much higher data rate and much higher amplitude than is otherwise achievable.

These and other objects, features, and advantages of the invention are accomplished by a method of making an optical signal comprising the step of providing a material. Incident radiation is directed at the material. The incident radiation includes a first parameter having an initial value. The incident radiation includes a first segment. A first stimulation is provided to the material to provide a first change to the first parameter in the first segment. A second stimulation is provided to the material to provide a second change to the first parameter in the first segment.

Another aspect of the invention is a method of generating an optical signal comprising the step of directing incident radiation at a material. The incident radiation comprises a first parameter having an initial value. A plurality of stimulations is provided to the material to change the value of the first parameter of radiation. A pulse of radiation is generated from the continuous radiation. The pulse of radiation comprises a second value of the first parameter. The pulse further comprises a pulse width, wherein the pulse width is shorter in time than is achievable with a single one of the plurality of stimulations or the second value is greater than can be achieved with a single one of the plurality of stimulations.

Another aspect of the invention is a device comprising a source of radiation for providing radiation having a first segment, a waveguide for modulating radiation from the source of radiation, a pulse generator, and a plurality of electrical conductors. The conductors are connected to the pulse generator with a splitter for receiving pulses in each conductor. The conductors extend across different portions of the waveguide and have delay elements that cause the pulses from the pulse generator at the waveguide to all intersect the first segment of the radiation.

Another aspect of the invention is a device for providing an optical signal, comprising a magneto-optical material. A source of incident radiation is configured to direct radiation at the material. The incident radiation includes a first parameter having an initial value. The incident radiation also includes a first segment. The device includes a first conductor for providing a first current pulse for providing a first magnetic stimulation to the material to provide a first change to the first parameter in the first segment. The device also includes a second conductor for providing a second current pulse for providing a second magnetic stimulation to the material to provide a second change to the first parameter in the first segment.

Another aspect of the invention is a method of providing a signal comprising the step of forming a light pulse comprising an on-portion and an off-portion. The off-portion has a residual magnitude. The pulse is directed through a saturable absorber to absorb residual off-signal. The pulse is amplified after the saturable absorption step.

Another aspect of the invention is a method of fabricating a device, comprising the steps of providing a substrate, forming a superconductor on the substrate, and forming a magneto-optical material on the superconductor.

BRIEF DESCRIPTION OF THE DRAWINGS

The foregoing and other objects, features, and advantages of the invention will be apparent from the following detailed description of the invention, as illustrated in the accompanying drawings, in which:

FIG. 6a is a circuit diagram showing a prior art transmission/amplification line;

FIG. 6b are graphs showing transmission of a wave form at different points along the transmission/amplification line of FIG. 6a;

FIG. 7a is a device diagram including a circuit, showing a single flux quantum pulse splitter that is used to split and amplify quantum flux pulses for transmission across a magneto-optical material;

FIG. 7b are graphs showing that current pulses resulting from the splitter of FIG. 7a have the same amplitude and wave form as the initial current pulse;

DETAILED DESCRIPTION OF THE INVENTION

The 4.52° rotation of the polarization of light described in the Sobolewski paper for a EuSe magneto-optical waveguide was produced by a 2.51 Oe magnetic field provided by a current pulse of 1 mA flowing in a superconducting Nb-trilayer from a 10 um$^2$ Josephson junction pulse generator. The present invention provides schemes to boost that rotation angle while increasing current pulse speed, signal amplitude, extinction coefficient, and data rate.

A review paper, "RSFQ Logic/Memory Family: A New Josephson-Junction Technology for Sub-Terahertz-Clock-Frequency Digital Systems," by K. K. Likharev and V. K. Semenov, IEEE Transactions on Applied Superconductivity, vol. 1, No. 1, March 1991, ("the Likharev paper"), shows that the speed-performance of a Josephson junction varies inversely with the size of the junction. Extrapolating from Table 1 in the Likharev paper, the 10 um$^2$ junction of Sobolewski would provide a switching time of 8 ps which would corresponds to a 125 GHz signal. The present inventors recognized that for higher speed current pulses, smaller junctions are needed. But smaller junctions would shrink the magnitude of the current that can be generated by the junction. They further recognized that this would limit the magnetic field induced at the magneto-optical material, and that would reduce the magnitude of rotation of the polarization of light traveling in the magneto-optical material. This would reduce the intensity of light emerging from the modulator. Thus, the present inventors recognized that to achieve higher speed, smaller junctions, smaller currents, smaller magnetic fields, and smaller rotations would result.

In addition, the present inventors recognized that superconductors provide a limit on current density, since if the critical current density for the superconductor is reached, the material stops behaving as a superconductor. To overcome this limit wiring can be widened or thickened to accommodate larger currents at a current density below the critical current density. However, optical pulse width may be limited by the width of the wiring. And the magnetic field in the magneto-optical material may be reduced by the greater distance introduced by thicker wiring.

The present inventors thus recognized that additional ideas would be needed in addition to the scheme provided by Sobolewski to increase optical signal speed with small high-speed Josephson junctions while also increasing the amount of rotation of the polarization of each signal.

The term light refers to electromagnetic radiation, not limited to the visible region. The terms light and radiation are used interchangeably herein. Typically a wavelength in the range of 1550 nm is used for optical fiber. However, substantial advantage is provided by using a shorter wavelength and then converting to the longer wavelength suitable for optical fiber.

Figure 3A:
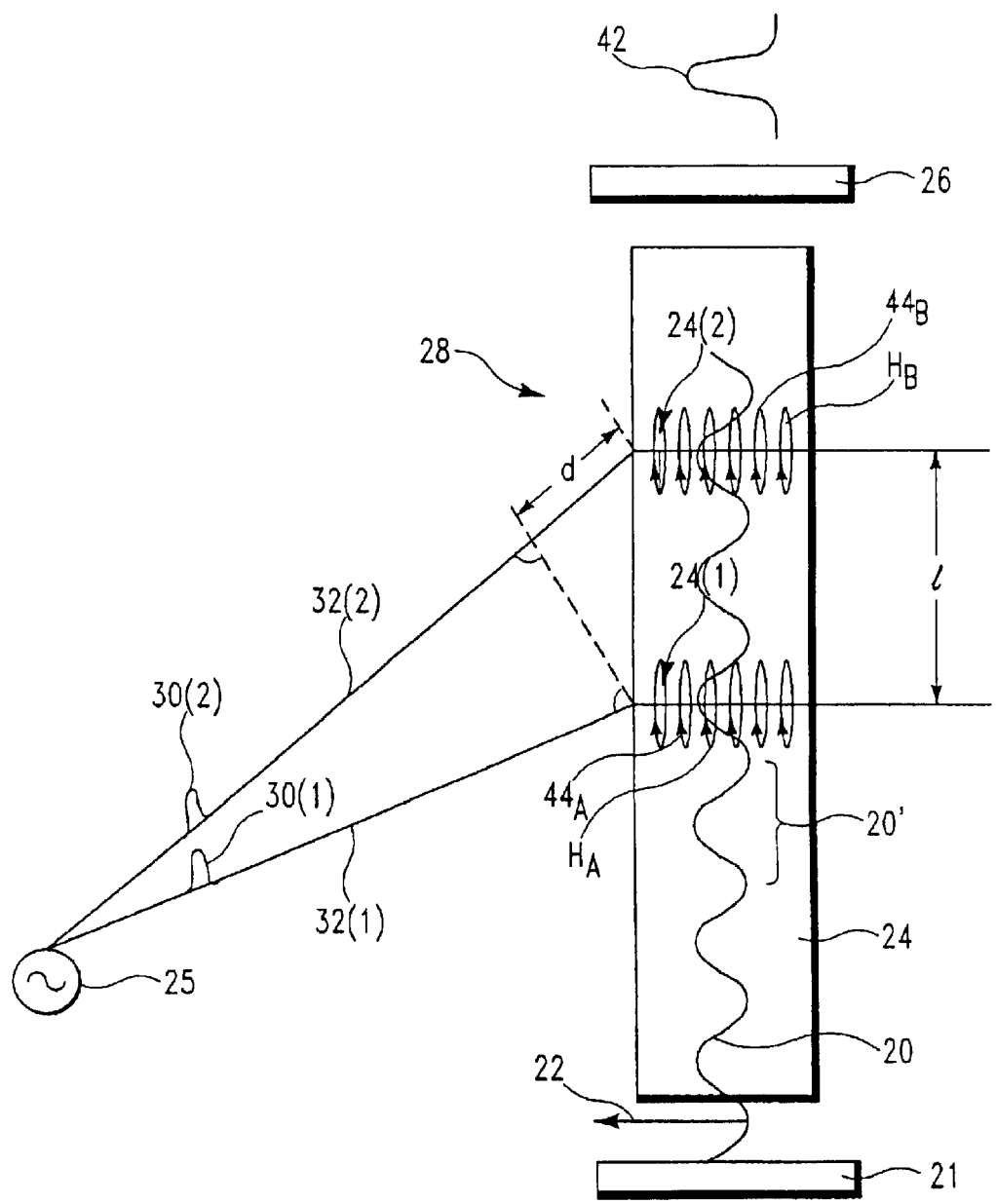
FIG. 3a is a top view of a magneto-optical waveguide crossed by two electrical conductors carrying pulses of current from a common pulse generator to provide magnetic fields for providing two rapid stimulations of the magneto-optical waveguide for providing two rapid rotations of the plane of polarization of light traveling through the waveguide to increase amplitude of rotation.
Figure 3B:
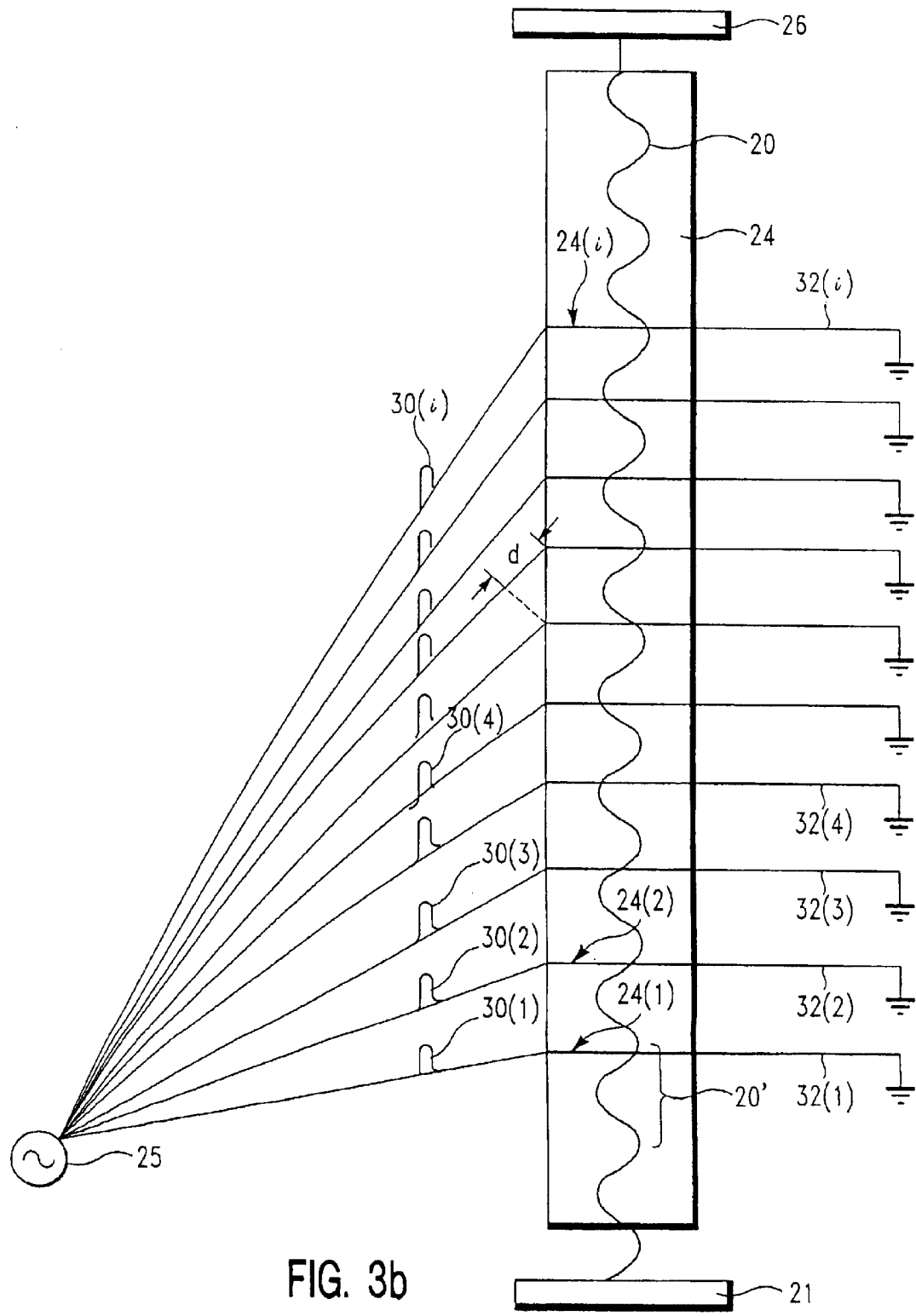
FIG. 3b is a top view of the magneto-optical waveguide of FIG. 3a showing additional electrical conductors carrying pulses of current across the magneto-optical material from the common pulse generator to further increase amplitude of rotation.

In the invention, continuous light wave 20 passing through polarizer 21 has polarization 22 pointing in initial direction $\theta_o$, is directed through magneto-optical material 24, as shown in FIG. 3a and FIG. 3b. Magneto-optical material 24 can include Cd, Mn, Se, Eu, O, S, Bi, C, K, Mg, Al, Br, Te, Cr, Fe, Ba, Y, Gd, Ga, I, Cl, Ni, Rb, Zn, Rh, Co, or Li. Well known magneto-optical materials include EuS, $CrBr_3$, EuO, EuSe, $Y_3Fe_5O_{12}$, $CrCl_3$, $Cd_{0.55}Mn_{0.145}Te$, and $Tb_2Al_5O_{12}$. Magneto-optical materials also include the materials described in the Sobolewski paper such as europium monochalcogenides (EuS, EuTe, EuO, and EuSe). Many other magneto-optical materials, such as those listed in the CRC Handbook of Chemistry and Physics, $80^{th}$ edition, pages 12–161 to 12–167 can also be used.

Figure 12:
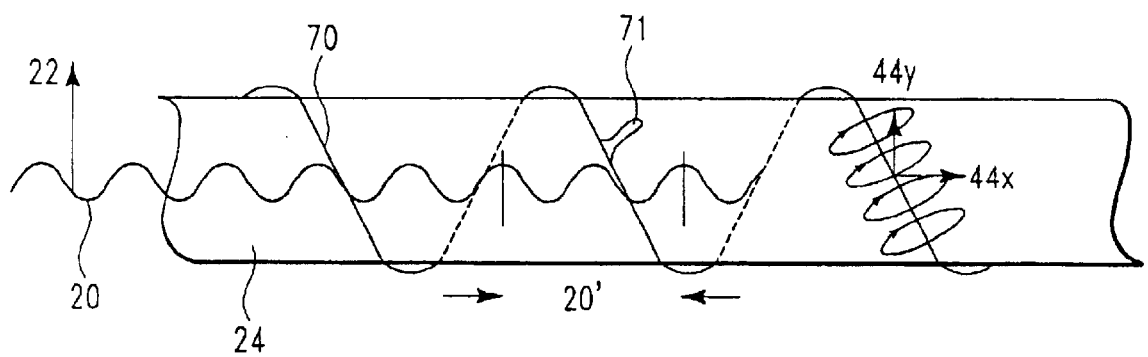
FIG. 12 shows a side view of a magneto-optical waveguide with a superconductor wrapped around to provide a pulse of current to a segment of optical wave traveling in the waveguide.

Light wave 20 may be generated by a source that provides polarized light, such as a polarized output laser, in which case polarizer 21 may be omitted. Light wave 20 can be plane polarized, circularly polarized, or elliptically polarized. Polarizer 26 is oriented to substantially prevent light with this initial polarization direction $\theta_o$ from being transmitted through polarizer 26, and then into optical fiber for further transmission through an optical network (not shown). This non-transmission provides the off-portion of the digital optical signal that will be developed in magneto-optical material 24. Thus, optical system 28 is set up so substantially no light is transmitted absent some stimulation of magneto-optical waveguide 24 to rotate polarization 22 of light wave 20 so that light can pass through polarizer 26. Although polarizer 26 is shown for simplicity, an interferometer configuration can be used instead, as shown in FIG. 12 of the U.S. patent application Ser. No. 09/796,026 filed the same day as this application and incorporated herein by reference.

Figure 4A:
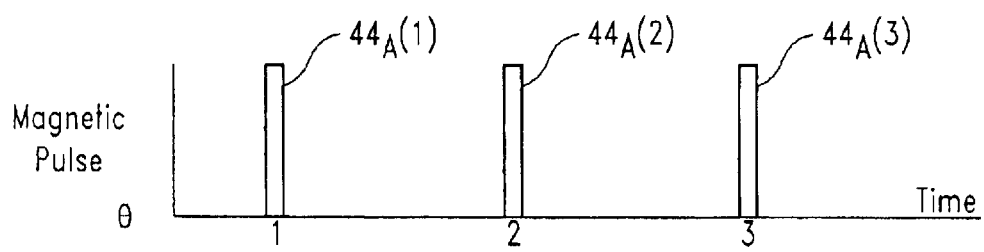
FIG. 4a is a graph showing magnetic field as a function of time from a plurality of current pulses that travel across the magneto-optical waveguide at different locations and at different times.
Figure 4B:
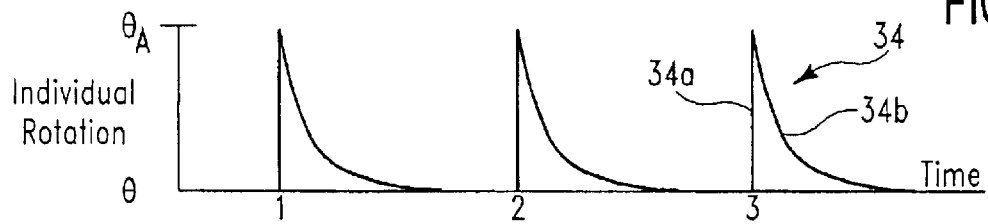
FIG. 4b is a graph showing the fast rotations from the multiple rapid excitations of the magneto-optical material and the slow rotations back from the multiple slow relaxations of the magneto-optical material.
Figure 5:
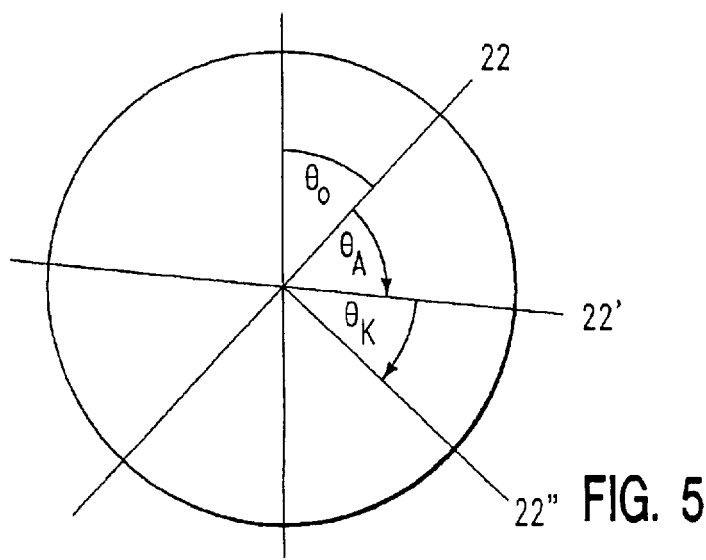
FIG. 5 is a diagram showing a change in angle of the plane of polarization of a segment of a wave traveling through the magneto-optical waveguide after a first pulse of current makes a traversal across the waveguide to intersect the segment and after a second pulse of current makes a traversal across the waveguide to intersect the segment.

The on-portion of the digital optical signal is provided by a first rapid magnetic stimulation $H_A$ of a first population in a first region 24(1) of magneto-optical material 24, as shown in FIG. 3a and in idealized form in FIG. 4a. The excitation of magneto-optical material in first region 24(1) causes segment 20' of light wave 20 traveling through first region 24(1) to have the direction of its polarization 22 rotated through angle $\theta_A$ from initial direction $\theta_o$, as shown in FIG. 4b and FIG. 5, and as described in a book, Handbook of Optics, edited by Michael Bass, et al, McGraw-Hill, 1995. The stimulation can be an interband effect, an excitonic effect a free-carrier effect, or an impurity magneto absorption effect. This stimulation is provided by magnetic field $H_A$ induced by pulse of current 30(1) traveling in conductor 32(1) across magneto-optical material 24 in region 24(1). As Baumberg found (FIG. 2a) this excitation and the corresponding rotation of polarization 22 in segment 20' of light wave 20 is very rapid, as shown by the nearly vertical rise of portion 34a of rotation angle curve 34. Segment 20' of light wave 20 with rotated polarization 22' rotated at angle $\theta_A$ with respect to initial angle $\theta_o$ can now penetrate through polarizer 26 (or the interferometer shown in FIG. 12 of the Ser. No. 09/796,026 and so a signal can be transmitted into the optical fiber. Because of the rotation of polarization 22', a significant intensity of light wave 20 can now pass through polarizer 26. Segment 20' comprises a width that is shorter than 100 ps, more preferably shorter than 10 ps, and even more preferably shorter than 1 ps.

An additional rotation of polarization 22' through angle $\theta_B$ is achieved by providing multiple conductors 32(1), 32(2) . . . 32(j) crossing magneto-optical material 24 at regions 24(1), 24(2) . . . 24(j), as shown in FIGS. 3a, 3b, and FIG. 5. Current pulse generator 25 directs current pulses 30(1), 30(2) . . . 30(j) along conductors 32(1), 32(2), . . . 30(j) to regions 24(1), 24(2) . . . 30(j). Current pulses 30(1), 30(2) . . . 30(j) all leave common pulse generator 25 at the same time and travel in their respective conductors. Delay elements are included in conductors 32(2) . . . 32(j). Delay elements can be conductors 32(1), 32(2) . . . 30(j) of sequentially longer length, as shown in FIGS. 3a, 3b, 7a, and 8. The Likharev paper describes elements that can be used for duplicating current pulses into different superconducting lines, amplifying the current pulses in each line, and providing different delay for the current pulses in each line.

As described in the Likharev paper, a Josephson-junction can serve as a waveform generator and a superconducting microstrip line with very low attenuation and dispersion allows picosecond waveforms to travel for distances exceeding typical chip size with low crosstalk. The ultrafast digital signals can be passed along the chips with a propagation speed approaching that of light. Alternatively, transmission/amplification line 40 can be used, as shown in FIG. 6a based on FIG. 3 in the Likharev paper. Transmission/amplification line 40 includes inductors L1, L2, L3 and Josephson junctions J1, J2, J3. Current supplies Ib1, Ib2, Ib3 are provided to respective junctions. Transmission/amplification line 40 maintains signal height over longer distances than a microstrip line, as shown by voltage curves J1, J2, J3 in FIG. 6b.

Figure 8:
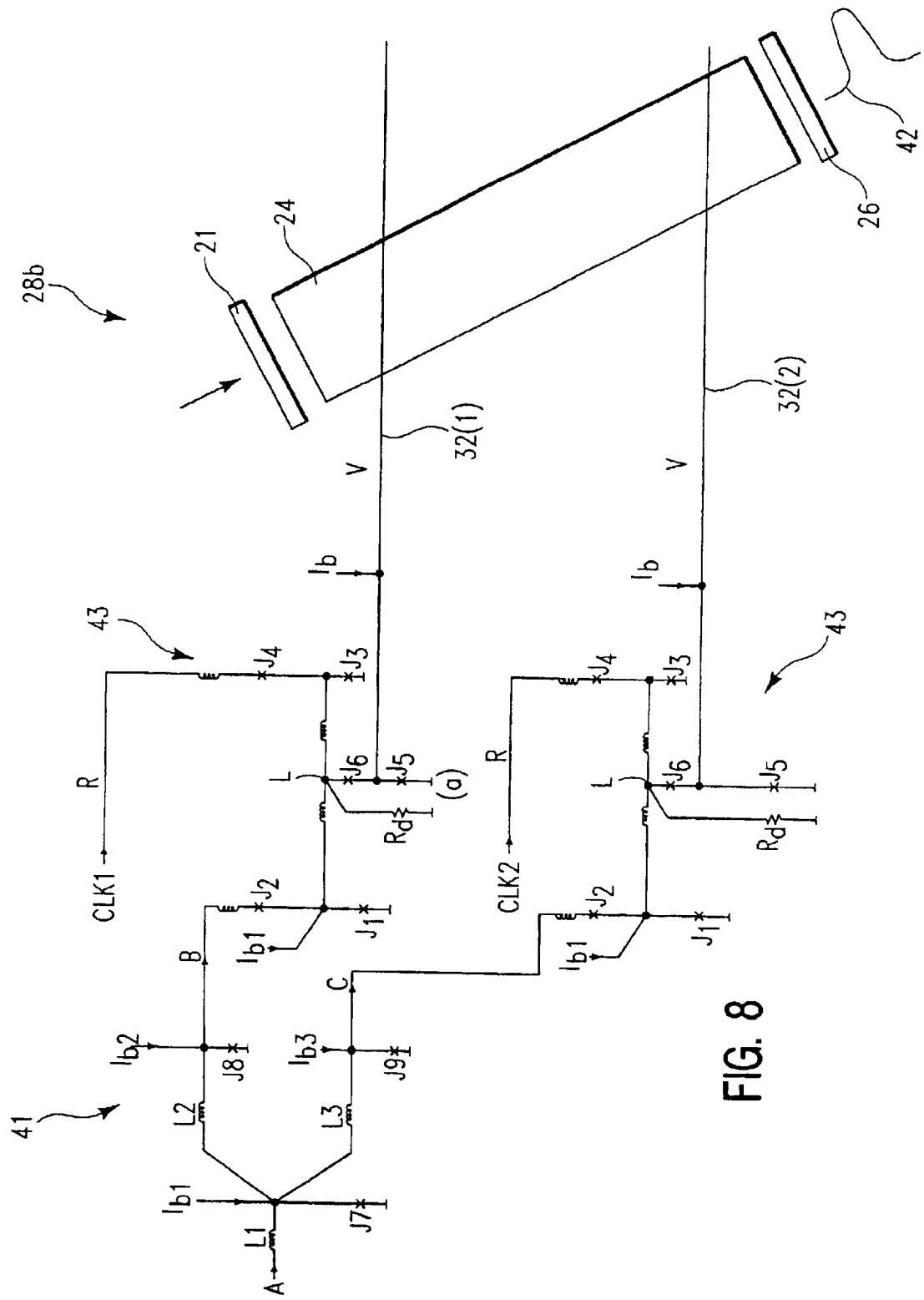
FIG. 8 is a device including a circuit, showing a single flux quantum pulse splitter feeding quantum flux pulses to SFQ/DC converters for conversion to dc current pulses.

In either case, signal along path A can be split into two signals along paths B and C of SFQ pulse splitter 41, as shown in FIG. 7a based on FIG. 4a of the Likharev paper. Signals in paths B and C are delayed compared to signal traveling in path A but each has a magnitude and signal shape identical to that of original signal in path A, as shown in FIG. 7b. Each path includes an inductance L1, L2, L3 and a Josephson junction J1, J2, J3. A cascade of such single flux quantum pulse splitters can be used to provide a multiple of signals from a signal source, represented by current pulse generator 25 in FIGS. 3a, 3b. DC current pulses can be provided using the circuit of FIG. 8. In this circuit, single flux quantum pulse splitter 41 is first used to split and amplify quantum flux pulses. Then the split pulses are converted to DC pulses by the SFQ/DC converters 43. A clock signal at the desired speed is provided to the reset input lines of the SFQ/DC converters 43. The result is DC current pulses, and these can be sent to stimulate magneto-optical material 24, as shown in FIG. 8. Current splitter 41 and SFQ/DC converters 43 are present but not shown in the circuits of FIGS. 3a, 3b, 9.

Delay for the individual lines can be introduced by providing lines of increasing length, as shown in FIGS. 3a, 3b, and in FIG. 7a, since the time for a current pulse to travel depends precisely on the length of conductor through which it must travel. The delay provides that the same segment 20' of light wave 20 traveling in magneto-optical material 24 receives the effect of multiple stimulations of magneto-optical material 24 and thereby emerges with an rotation that is a multiple of that provided by a single current pulse. Optical pulse 42 emerging from polarizer 26 therefore has a larger amplitude.

Conductor 32(2) is set to be longer than conductor 32(1) by an amount d so current pulse 30(2) reaches magneto-optical material 24 at region 24(2) at a time after current pulse 30(1) reaches region 24(1), as shown in FIG. 3a, 3b.

Figure 4C:
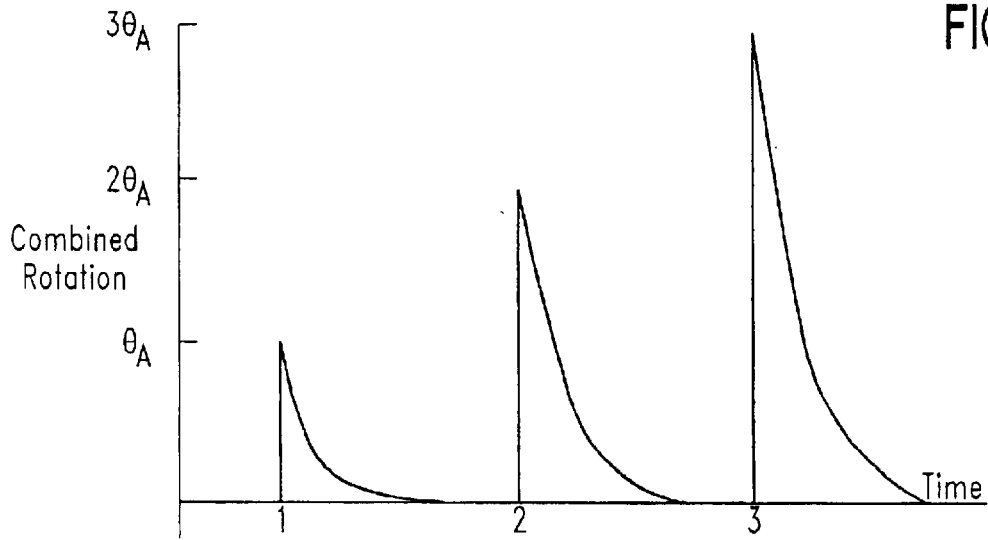
FIG. 4c is a graph showing the cumulatively growing polarization rotation resulting from the cumulative linear combinations of rotations in FIG. 4b.

The amount d is set so current pulse 30(2) arrives at region 24(2) at the same time segment 20' of light wave 20 arrives at region 24(2). Segment 20' was the portion of light wave 20 that had its polarization rotated as a result of current pulse 30(1) traveling along conductor 32(1) stimulating region 24(1) of magneto-optical material 24. d is determined by the ratio of current pulse speed v in conductor 32(2) to speed of light c in magneto-optical material 24 as $$d = l \ v/c$$

where l is the spacing between conductors 32(1) and 32(2) as they cross over magneto-optical material 24. The scheme depends on providing multiple current pulse stimulations 30(1), 30(2), ... 30(j) at just the right time for each current pulse to contribute to rotation of polarization 22 of segment 20' of light wave 20 traveling through magneto-optical material 24. Thus, with two conductors crossing magneto-optical material 24, polarization 22 of segment 20' of light wave 20 is rotated twice. All other segments of wave 20 have no rotation of polarization 22. The first rotation of polarization 22 of segment 20' of light wave 20 occurs at region 24(1) of magneto-optical material 24 as a result of stimulation of a first population of magneto-optical material 24 by current pulse 30(1). This stimulation causes a rotation of polarization 22 through angle $\theta_A$ resulting in polarization 22' as shown in FIG. 5. The second rotation is at a slightly later time when segment 20' of light wave 20 reaches current pulse 30(2) arriving along conductor 32(2) at region 24(2) of magneto-optical material 24. This second stimulation causes a rotation of polarization 22' through a second angle $\theta_A$ resulting in polarization 22". The effect of the two current pulses 30(1), 30(2) on polarization 22 of segment 20' of light wave 20 is additive resulting in polarization rotating through angle $\theta_A + \theta_A$, as shown in FIG. 4c and FIG. 5.

Alternatively various delay circuits can be used along superconductors 32(1), 32(2), ... 30(j) to introduce delay to provide current pulses in time to amplify an optical signal traveling in material 24. Delay circuits include RSFQ buffer stages, shown in FIG. 5 of the Likharev paper, or SFQ RS flip-flops, shown in FIG. 7, pairs of SFQ T flip-flops, in FIG. 8 NDRO/DRO register cells in FIG. 11, and pairs of RSFQ inverters in FIG. 12 of the Likharev paper.

Additional rotations of the polarization of segment 20' of light wave 20 can be provided with additional conductive lines, 32(3), 32(4) ... 32(j), all tied to current pulse generator 25, as shown in FIG. 3b. Current pulses 30(1), 30(2) ... 30(j) leave from pulse generator 25 at the same time along conductive lines 32(1), 32(2) ... 32(j). Each succeeding line 32(n) is longer than preceding line 32(n−1) by an amount d to provide current pulse 30(n) at region 24n over magneto-optical material 24 at the same time segment 20' of light wave 28 reaches region 24n. Each current pulse 30(n) provides a magnetic field pulse to stimulate a population of magneto-optical material 24 at each region 24n, and this stimulation causes polarization 22 of segment 20' of light wave 20 to rotate an additional amount at each region 24(n). Sequential arrival of magnetic pulses along locations where conductive lines 32(1), 32(2), 32(3) cross magneto-optical material 24 is shown in FIG. 4a, which provide individual contributions to rotation at each intersection as shown in FIG. 4b. The cumulative rotation as a result of the addition of each rotation to segment 20' of light wave 20 is shown in FIG. 4c.

For example, current pulses in ten conductive lines of steadily increasing length crossing magneto-optical material 24 would provide a rotation angle of 45.2° based on the 4.52° rotation achieved by Sobolewski for a current pulse in a single conductor. With 20 conductive lines, each having a 1 mA current pulse from pulse generator 25 and the splitter circuit shown in FIG. 7a and FIG. 8, a 90° rotation can be achieved. Maximum penetrates polarizer 26 when the rotation is 90°.

Figure 1A:
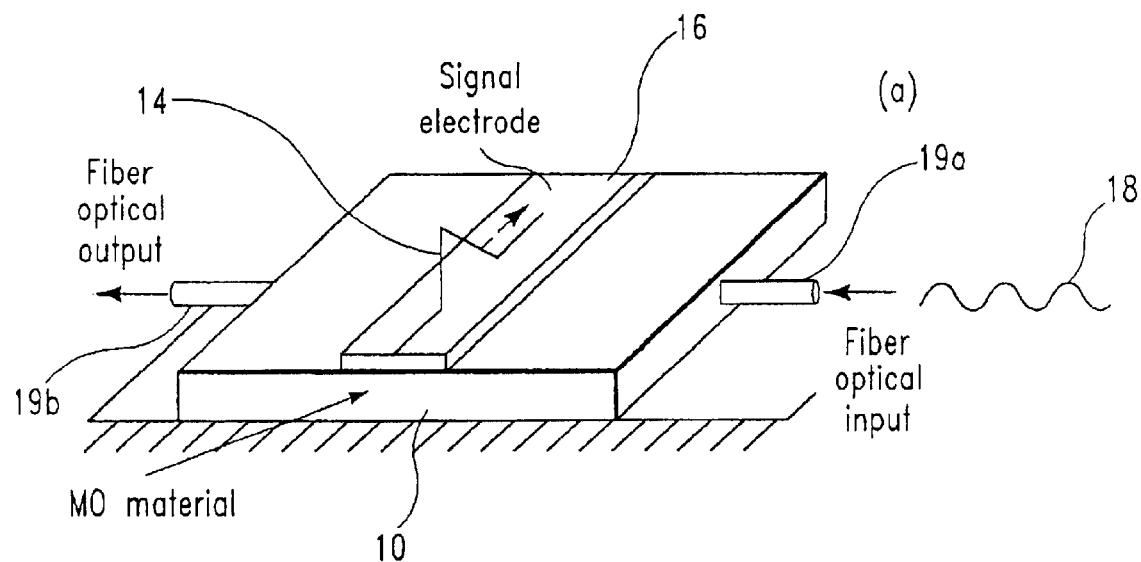
FIG. 1a is a top view of a magneto-optical waveguide of the prior art crossed by a signal electrode carrying a pulse of current for generating a magnetic field.
Figure 1B:
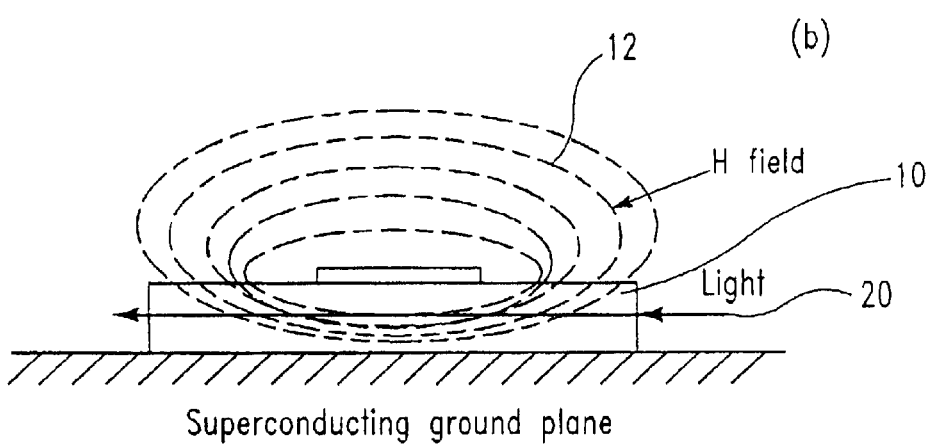
FIG. 1b is a cross sectional view of the magneto-optical waveguide of FIG. 1a showing the magnetic field generated by the current pulse extending parallel to the direction of light propagation in the magneto-optical waveguide.
Figure 2A:
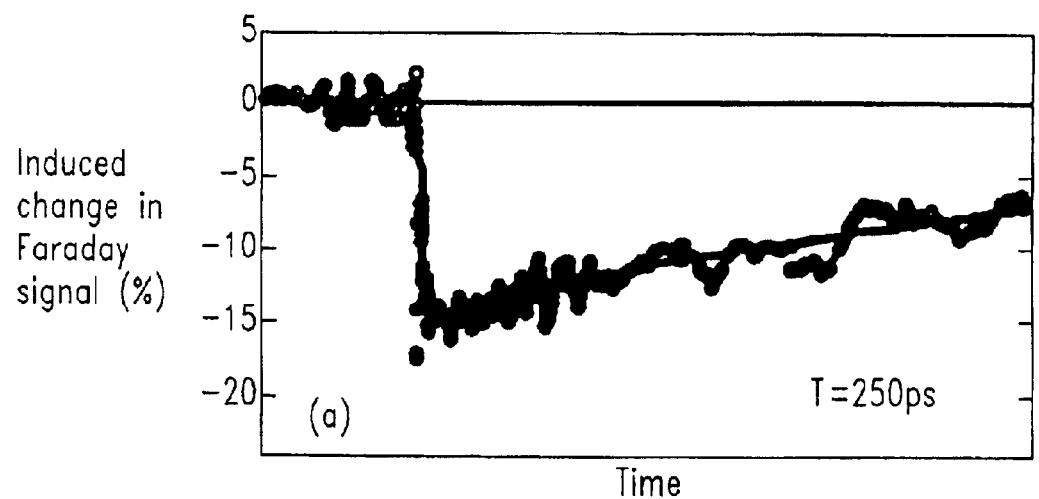
FIG. 2a illustrates the fast excitation and the slow relaxation of a magneto-optical material as reported in the prior art.
Figure 2B:
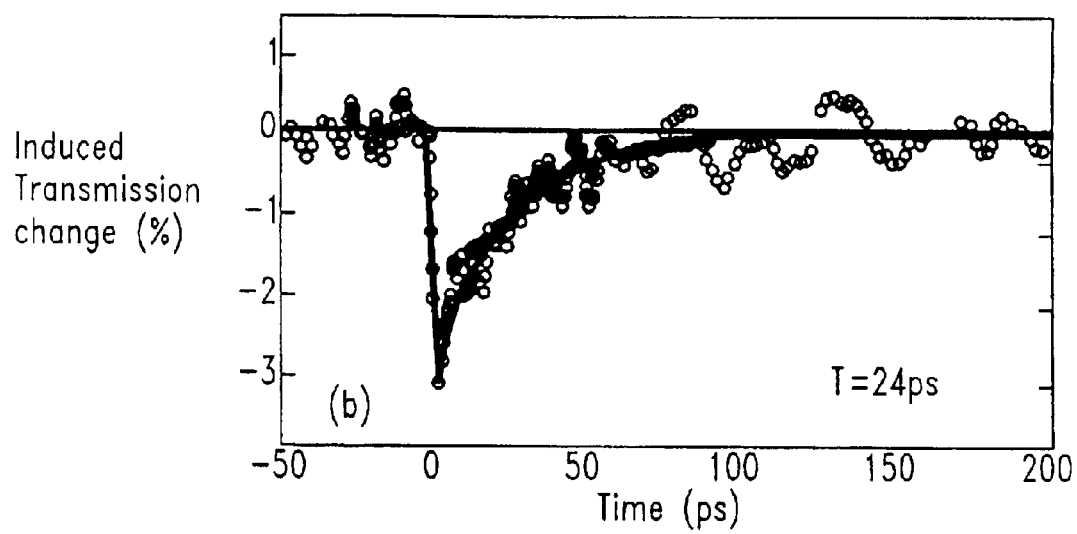
FIG. 2b illustrates the effect of the fast excitation and the slow relaxation of a magneto-optical material on light transmitted through a polarizer or interferometer, as reported in the prior art.

If left alone, relaxation of magneto-optical material 24 back to an unexcited state is relatively slow, as shown in FIG. 2a and by portion 34b of curve 34 in FIG. 4b, so light wave 20 with plane of polarization 22' rotated at an angle between angle $\theta_A$ and $\theta_o$ would continue to pass through polarizer 26 for a time about equal to the relaxation time. Material 24 gradually de-excites, plane of polarization gradually returns to $\theta_o$ (FIG. 4b), and intensity of light wave 20 penetrating polarizer 26 decreases until intensity of light transmitted through polarizer 26 goes back to zero, as shown in FIG. 2b from the Baumberg paper. This is the on-portion of digital signal that can penetrate polarizer 26. Since the intensity of light transmitted through a polarizer goes as the square of the sine of the angle between the polarization and the transmitting axis of the polarizer, the intensity of light falls substantially faster than relaxation of magneto-optical material 24, as shown in FIG. 2b. However, there is still a substantial time for this decline in intensity.

Figure 9:
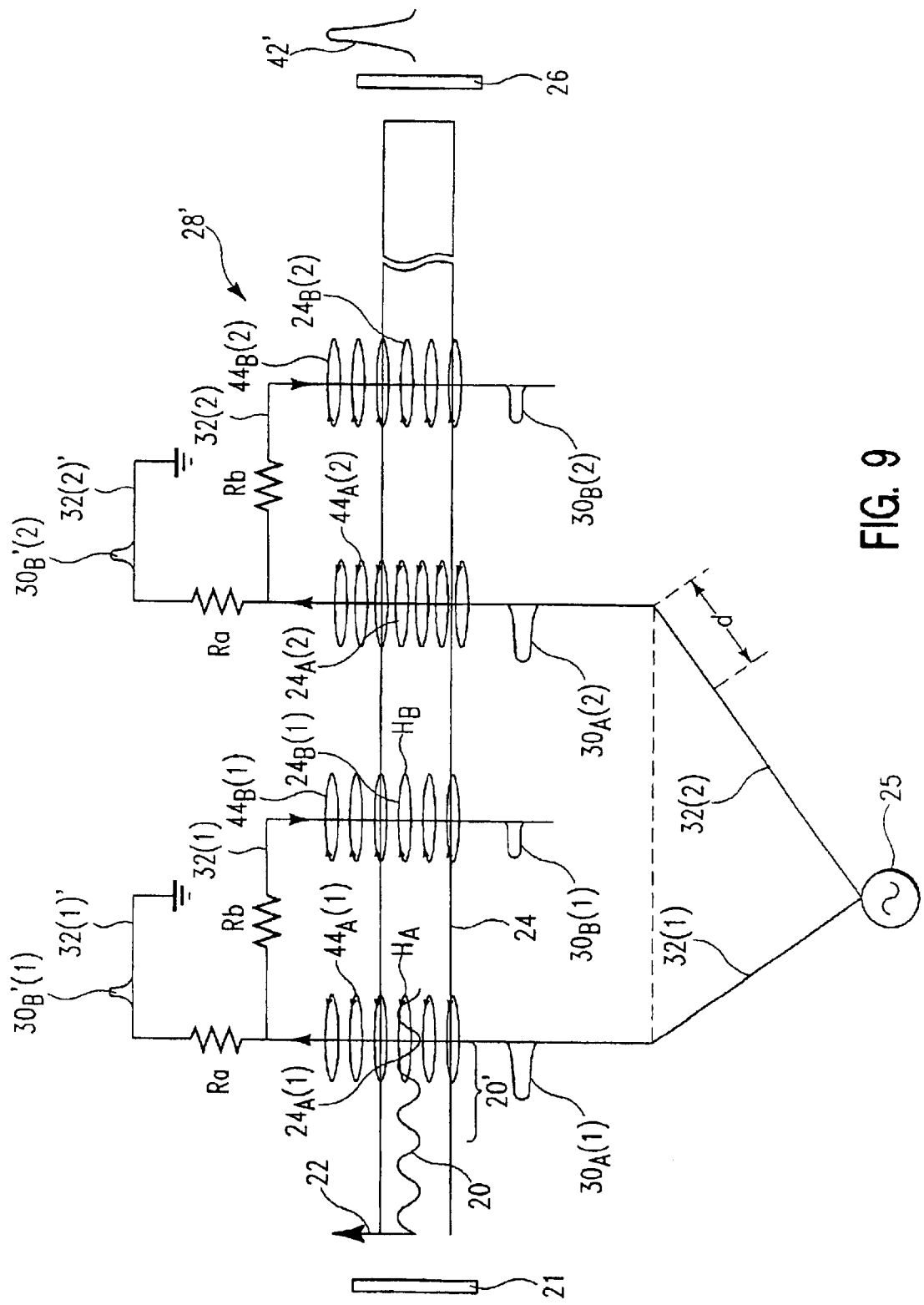
FIG. 9 is a top view of a magneto-optical waveguide crossed by two pairs of electrical conductors carrying pulses of current from a common pulse generator to provide magnetic fields for providing two pairs of oppositely directed rapid stimulations of the magneto-optical waveguide for providing two rapid rotations of the plane of polarization of light traveling through the waveguide to increase amplitude of rotation while cancelling effect of slow relaxation.

U-shaped conductors 32(1), 32(2), as shown in FIG. 9, illustrate a way to increase optical signal amplitude and also provide extremely short pulses having a pulse width that is less than the time for excitation plus the time for relaxation of magneto-optical material 24. The scheme to provide short current pulses is more fully described in U.S. patent application Ser. No. 09/796,026 filed on the same day as this application and incorporated herein by reference. Application of this scheme is described here to provide short current pulses having very high amplitude.

In this embodiment each of conductors 32(1), 32(2), is folded back over optical waveguide 24 to provide that current pulses 30(1), 30(2) pass over magneto-optical material 24 a second time and provide a second oppositely directed pulse, as shown in FIG. 9. Such a pair of oppositely directed current pulses provide opposite stimulation to two regions of magneto-optical material 24 to provide segment 20' of light wave 20 traveling through both regions with opposite slow relaxations. The effect of the two opposite slow relaxations on light traveling in both regions is thereby cancelled out.

Figure 10A:
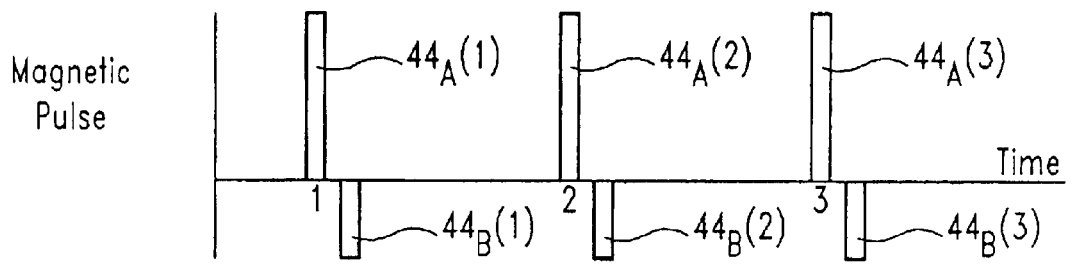
FIG. 10a is a graph showing magnetic field as a function of time from multiple pairs of current pulses that travel across the magneto-optical waveguide in opposite directions at different times.
Figure 10B:
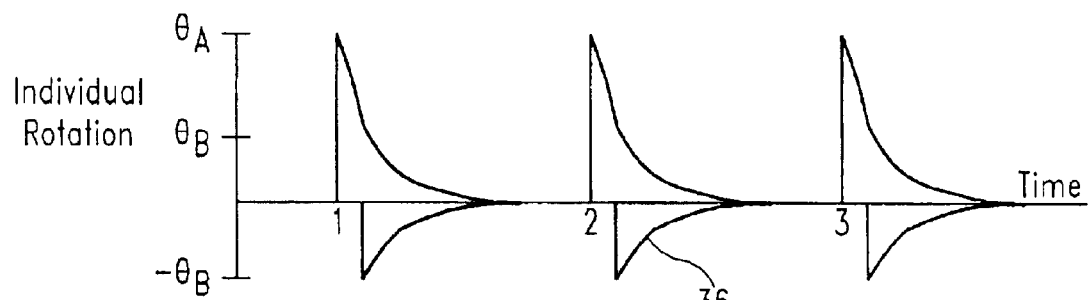
FIG. 10b is a graph showing the fast rotations from the multiple rapid excitations of the magneto-optical material and the slow rotations from the multiple slow relaxations of the magneto-optical material in which the second rotation of each pair is in an opposite direction to the first rotation.

Conductor 32(1) provides current pulse $30_A(1)$ traveling across magneto-optical material 24 to induce magnetic field pulse $44_A(1)$ in material 24 in region 24a(1). Conductor 32(1) also provides current pulse $3_B(1)$ traveling in opposite direction across magneto-optical material 24 to induce magnetic field pulse $44_B(1)$ in region $24_B(1)$. As described in the application Ser. No. 09/796,026, current pulse $30_B(1)$ arrives at region $24_B(1)$ after segment 20' of light wave 20 having its polarization rotated at region $24_A(1)$ has reached region $24_B(1)$. Oppositely directed current pulse $30_B(1)$ provides stimulation to magneto-optical material 24 to rotate polarization 22 of light wave 20 back to initial direction $\theta_o$. The opposite rotation provides an oppositely directed slow relaxation that cancels the lengthy effect of slow relaxation of magneto-optical material 24 on light wave 20 from current pulse $30_A(1)$ shown in FIG. 10c. Thus, two rapid stimulations of segment 20' of light wave 20 provide a light pulse having a width that is less than the time for excitation plus time for relaxation and provide an off-signal as shown in FIGS. 10a, 10b, 10c.

The second oppositely directed stimulation to segment 20' of light wave 20 is provided a short time after the first stimulation of segment 20' depending on the speed v of current pulse $30_A(1)$ traveling in conductor $32(1)$ and the speed of light c in magneto-optical material 24. That portion of segment 20' of light wave 20 experiencing just first stimulation $44_A(1)$ becomes on-portion 20b of optical signal 42', since that is the only portion of light wave 20 that can penetrate polarizer 26.

Figure 10C:
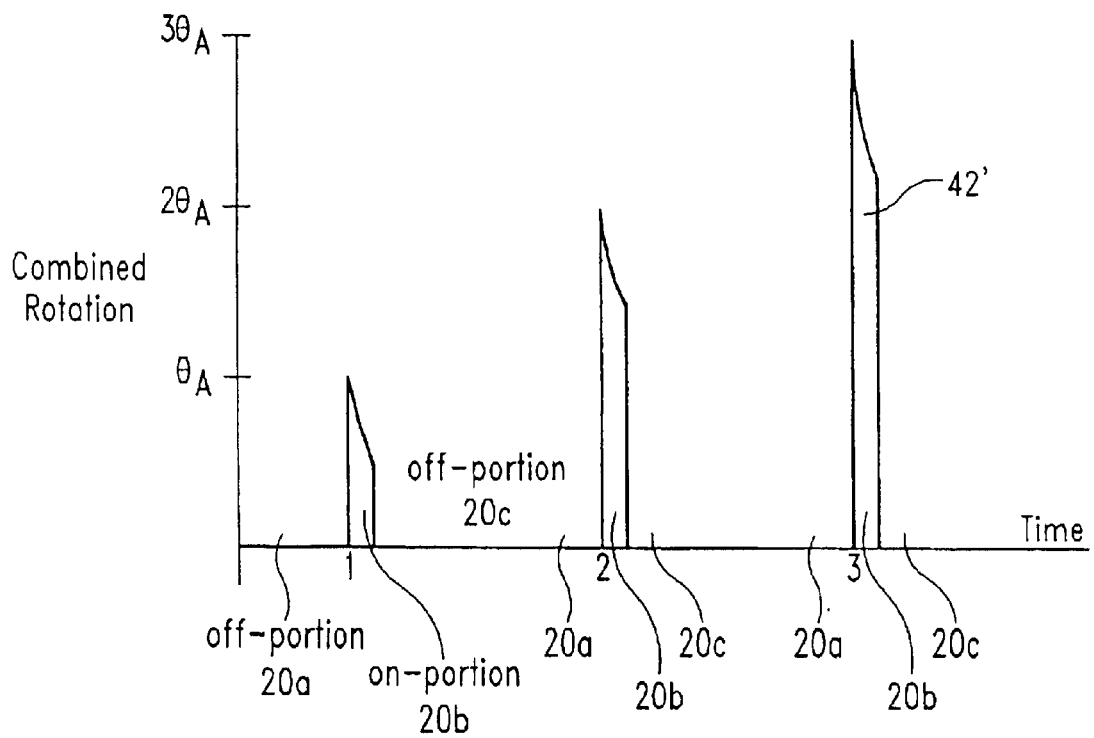
FIG. 10c is a graph showing the cumulatively growing polarization rotations resulting from the cumulative linear combinations of rotations in FIG. 10b.

Light wave 20 is thereby divided into three portions: off-portion 20a of light wave 20 experiences none of the rotations and does not penetrate through polarizer 26, as shown in FIG. 10c. On-portion 20b experiences rotations from each current pulse crossing magneto-optical material 24, and at least some of this light can penetrate through polarizer 26. Finally, off-portion 20c experiences a linear combination of both rotations from oppositely directed current pulses, and this double rotation rotates the direction of the polarization back to the initial direction so no light can penetrate through polarizer 26. Thus, only a narrow pulse of radiation penetrates polarizer 26, and this pulse is defined by time for a current pulse to travel between two locations in a magneto-optical material to provide two rapid excitations to the material less the time for light to travel between those two locations.

The present invention provides increased amplitude of rotation of polarization 22, as compared to the invention of application Ser. No. 09/796,026, by sequentially providing one or more additional rotations of the polarization—while each time cancelling the affect of slow relaxation of magneto-optical material 24—so no speed penalty is introduced. Optical efficiency, throughput, and extinction ratio are all improved while the extremely high data rate available from the extremely short pulses of application Ser. No. 09/796,026 is retained.

The present invention boosts on-portion 20b with sequential current pulse $30_A(2)$ in second conductor $32(2)$, while also providing a sequential oppositely directed stimulation of magneto-optical material 24 to rotate the polarization of segment 20' of light wave 20 back to initial direction $\theta_o$ cancelling out the effect of the slow relaxation 34b, as shown in FIGS. 9 and 10a–10c. Conductor $32(2)$ provides current pulse $30_A(2)$ traveling across magneto-optical material 24 to induce magnetic field pulse $44_A(2)$ in material 24 in region $24_A(2)$. The excitation of magneto-optical material in third region $24_A(2)$ causes segment 20' of light wave 20 traveling through region $24_A(2)$ to have the direction of its polarization further rotated through an additional angle $\theta_A$ to provide a total angle of $2\theta_A$ from initial direction $\theta_o$, as shown in FIG. 10b. More of segment 20' of light wave 20 with rotated polarization 22" rotated at angle $2\theta_A$ with respect to initial angle $\theta_o$, can now penetrate through polarizer 26 (or the interferometer shown in FIG. 12 of application Ser. No. 09/796,026) and so a signal with a larger amplitude can be transmitted into optical fiber. Because of the larger rotation of polarization 22", a larger intensity of segment 20' of light wave 20 can now pass through polarizer 26. Thus the on-portion of the digital signal is amplified, and the signal has more rotation of the polarization.

Conductor $32(2)$ also provides current pulse $30_B(2)$ traveling in opposite direction across magneto-optical material 24 to induce magnetic field pulse $44_B(2)$ in region $24_B(2)$, as shown as shown in FIG. 10a. Rapid magnetic stimulation $44_B(2)$ is aimed in opposite direction to stimulation provided by magnetic field $44_A(2)$. This fourth stimulation is provided by current pulse $30_B(2)$ returning across magneto-optical material 24 in region $24_B(2)$ in opposite direction from current pulse $30_A(2)$. The oppositely directed magnetic field $44_B(2)$ that this current pulse $30_B(2)$ induces causes a stimulation of magneto-optical material 24 in region $24_B(2)$, and this stimulation causes segment 20' of light wave 20 traveling through second region $24_B(2)$ to have the direction of its polarization 22 rotated through angle $-\theta_B$ as shown with curve 36 in FIG. 10b, equal in magnitude to remaining rotation $\theta_B$ in region $24_A(2)$ provided by first current pulse $30_A(2)$. The opposite rotation provides an oppositely directed slow relaxation that cancels the lengthy effect of slow relaxation of magneto-optical material 24 on light wave 20 from current pulse $30_A(2)$ in region $24_A(2)$. The net effect of both stimulations is that a portion of light wave 20 has its polarization 22 experiencing both a rapid clockwise and a rapid counter clockwise rotation separated in time; the polarization of segment 20' of light wave 20 that experiences both rotations will point back in the initial direction $\theta_o$, and this light that experiences both rotations will again be blocked by polarizer 26 providing an off-portion of the digital signal, as shown in FIG. 10c. Thus, narrow light signal 42' having higher intensity and a polarization rotated through a larger angle emerges from polarizer 26, as shown in FIG. 9 and FIG. 10c.

Thus, sequential arrival of magnetic pulses along locations where conductive lines $32(1)$, $32(2)$, $32(3)$ cross and recross magneto-optical material 24 is shown in FIG. 10a, which provide pairs of individual contributions to rotation at each pair of intersections, as shown in FIG. 10b. The cumulative rotation as a result of the addition of each pair of rotations to segment 20' of light wave 20 is shown in FIG. 10c.

Many more such U-shaped conductors can be provided along magneto-optical material 24 to provide additional pairs of pulses to provide further rotations, further increasing optical signal amplitude, each time providing a fast oppositely directed stimulation to rotate polarization 22 of segment 20' of light wave 20 back to initial direction $\theta_o$ and to provide an oppositely directed slow relaxation to cancel the effect of the initial slow relaxation. The result of n pairs of such current pulses is an on-signal with a magnitude equal to n times rotation angle $\theta_A$ provided by a single current pulse, as shown in FIG. 10c for n=1, n=2, and n=3.

Amplitude of rotation of radiation induced by oppositely directed current pulses $30_B(1)$, $30_B(2)$ may be appropriately adjusted by spacing electrical conductor $32(1)$, $32(2)$ more distantly from second region $24_B(1)$, $24_B(2)$ than from first region $24_A(1)$, $24_A(2)$. Alternatively, parallel current paths $32(1)'$, $32(2)'$ can be provided, as shown in FIG. 9, to bleed off-portion $30_B'(1)$, $30_B'(2)$ of current pulse $30_A(1)$, $30_A(2)$ so remaining portion $30_B(1)$, $30_B(2)$ provides stimulation to more nearly match amplitude of rotation of light experiencing partially relaxed magneto-optical material in regions $24_A(1)$, $24_A(2)$, as shown in FIG. 10c. Parallel path $32(1)'$, $32(2)'$ may be a parallel superconducting path or it may have resistor Ra trimmed to properly make adjustment in current pulse $30_B'(1)$, $30_B'(2)$ to provide a matching rotation. At very high frequencies superconductors $32(1)$, $32(1)'$ both start to exhibit resistance. And these resistances can be used to provide Ra, Rb to adjust the division of current. Each resistance can be set by laser trimming dimensions of superconductor $32(1)$, $32(1)'$. Providing variable resistors Ra and Rb to adjust the amount of return current pulse $30_B'(1)$, $30_B'(2)$ bled off before remaining current $30_B(1)$, $30_B(2)$ passes over magneto-optical material 24, allows the overall off-signal to be decoupled from the on-signal, substantially improving the extinction ratio.

Pulse 42' is the only part of light wave 20 that has experienced net rotation, and so this is the only part of light wave 20 that penetrates polarizer 26, providing the on-signal. Only for the brief time measured by the time for current pulse $30_A(1)$ to traverse conductor 32(1) between two stimulation regions $24_A$, $24_B$ less the time for light to traverse spacing between regions $24_A$, $24_B$ in magneto-optical material 24 can light penetrate polarizer 26. This pulse of light 42' is far shorter than the time for stimulation plus the time for relaxation of the magneto-optical material. Thus, the invention provides a pulse having a time that is much less than the time for excitation plus the time for relaxation of the magneto-optical material. The additional rotations provided to this same segment 20' of light wave 20 in regions $24_A(j)$ add to the amplitude of the rotation signal but do not add to its width. Thus, pulse 42' has high amplitude and short pulse width.

Providing a large number of pairs of conductors can thus provide a large increase in the angle of rotation of emerging light pulse 42 while avoiding delay from the slow relaxation of magneto-optical material 24.

Figure 11A:
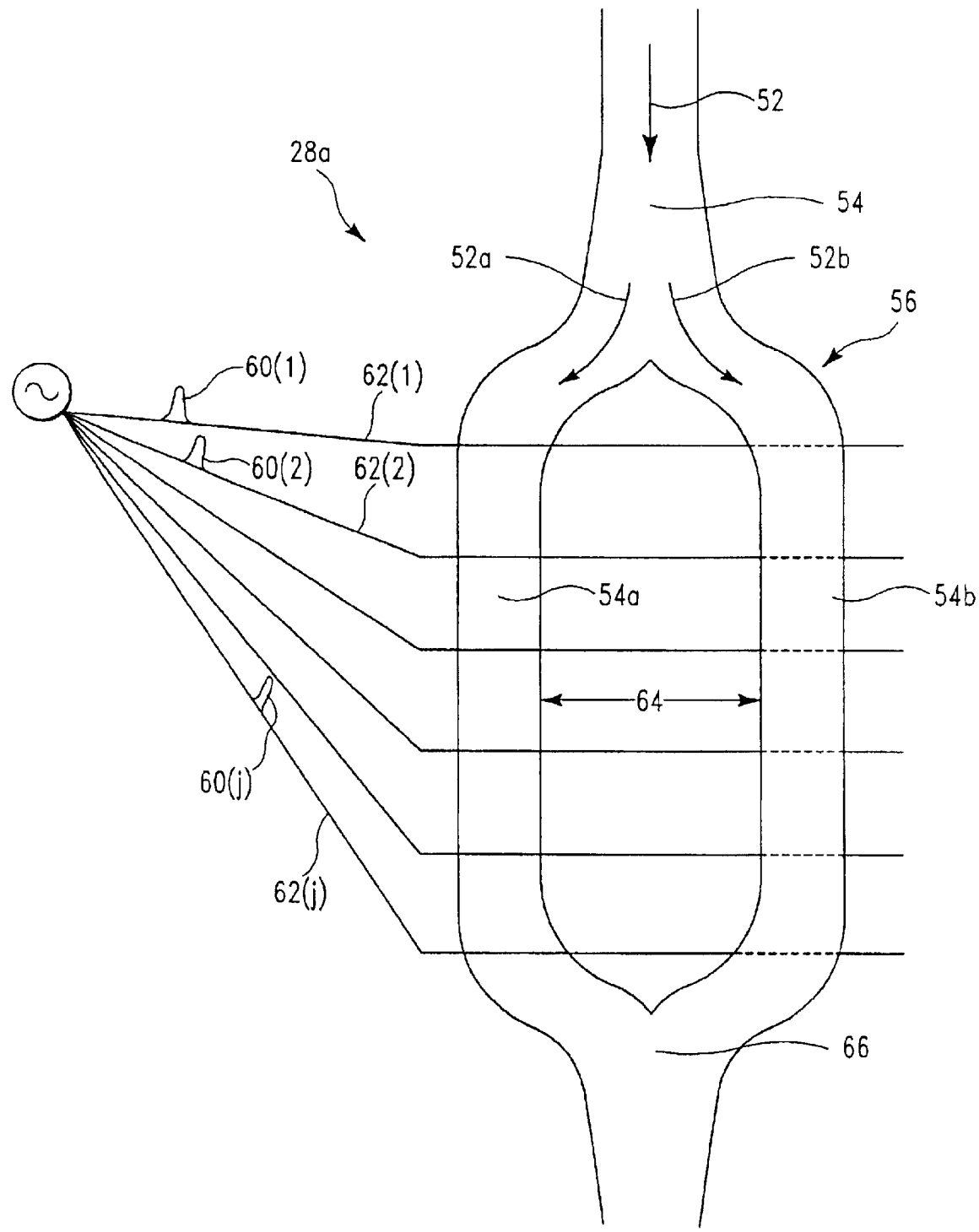
FIG. 11a shows a split waveguide and an alternate arrangement for providing the multiple stimulations of the present invention.
Figure 11B:
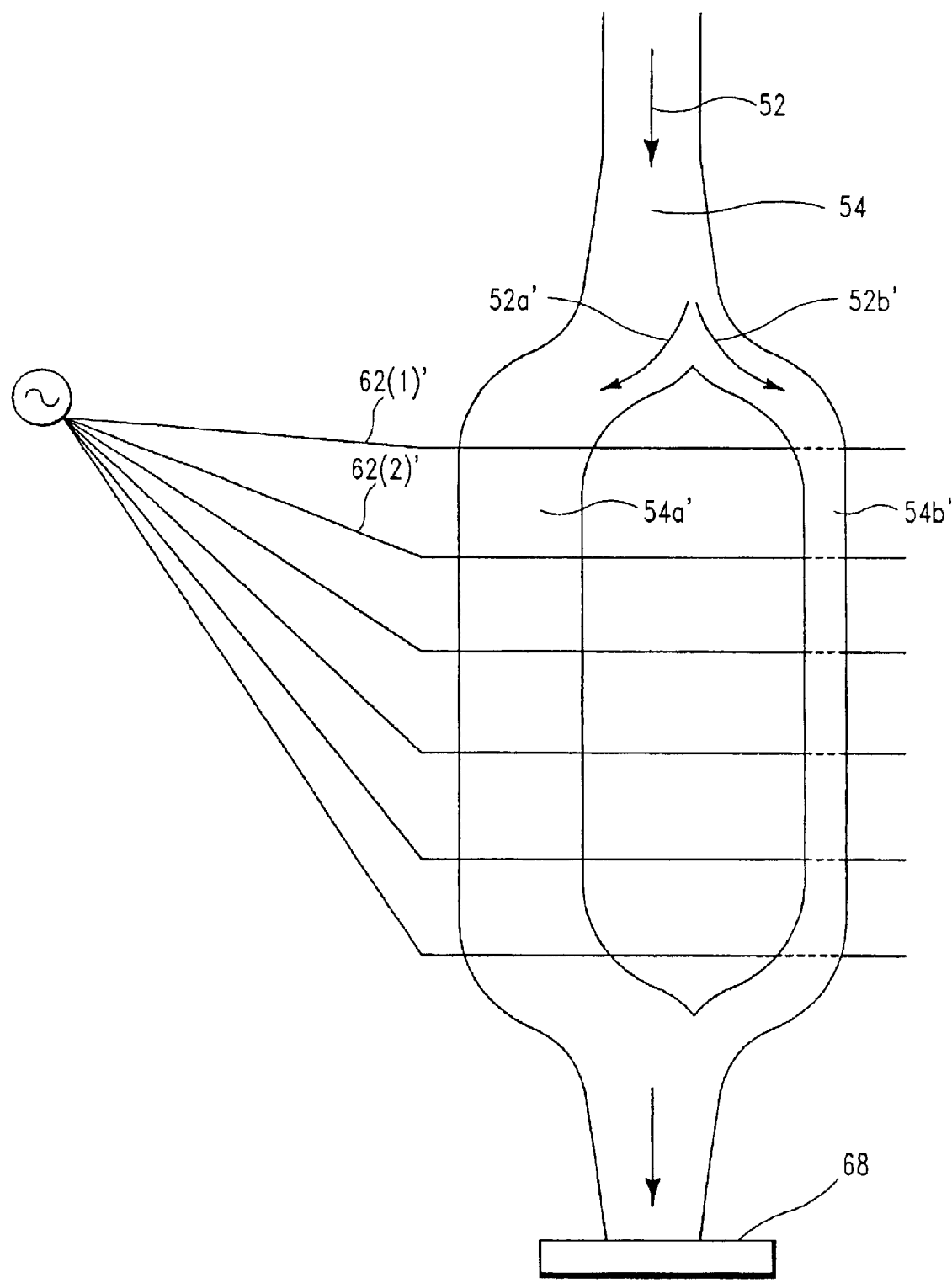
FIG. 11b shows another split waveguide that provides inhomogeneous division of the wave.

A Mach-Zehnder interferometer can also be used to practice the invention. Light wave 52 traveling in magneto-optical material 54 splits into two waves 52a, 52b where waveguide 54 splits into arms 54a, 54b. In this case multiple wires 62(1), 62(2), 62(3) ... 62(j) may all extend above arm 54a and below arm 54b of Mach-Zehnder interferometer 56, as shown in FIG. 11a. Light waves 52a, 52b recombine at location 66 and provide both a high signal amplitude and a short pulse width signal 69 through polarizer 68. Inhomogeneous division of light wave 52 into unequal waves 52a', 52b' can be provided, as shown in FIG. 11b by providing unequal arms 54a', 54b' to provide for more complete cancellation of effect of two slow relaxations.

Single conductor 70 wrapped around magneto-optical material 24 can provide multiple stimulations to magneto-optical material 24 to increase amplitude in segment 20' of light wave 20, as shown in FIG. 12. The component of magnetic field 44x induced by current pulse 71 that extends parallel to the direction of light wave 20 provides the stimulation to magneto-optical material 24 to cause rotation of the direction of polarization 22. Such a scheme depends on current pulse 71 traveling at a speed sufficient to keep up with segment 20' of light wave 20 as it travels in magneto-optical material 24. Alternatively, magneto-optical material 24 can be wrapped around conductor 70 to provide the same effect if current pulse 71 travels more slowly in conductor 70 than segment 20' of light wave 20 travels in magneto-optical material 24.

Figure 13:
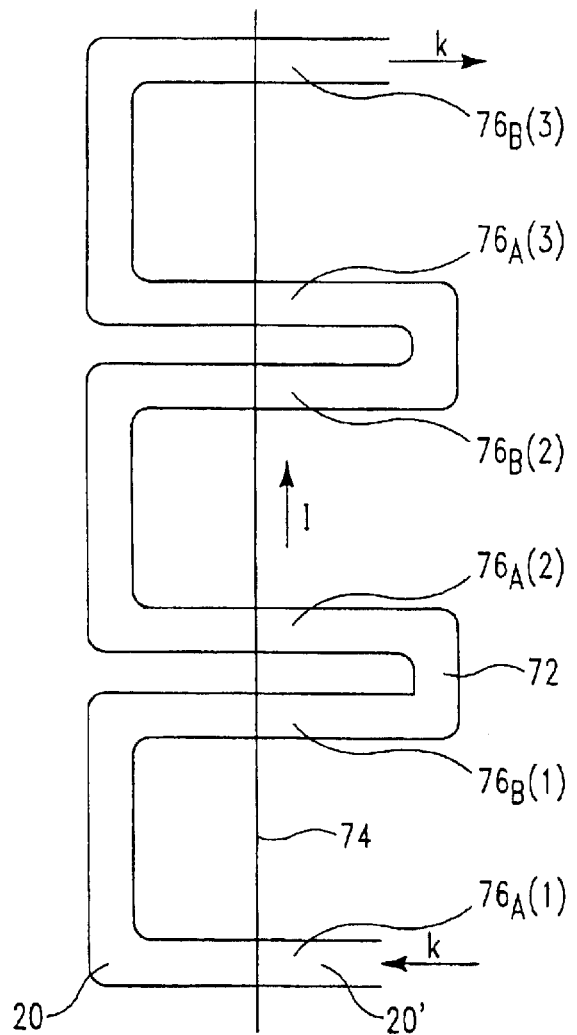
FIG. 13 shows a top view of a serpentine magneto-optical waveguide crossed by a superconductor to provide a pulse of current to a segment of an optical wave traveling in the waveguide.

Similarly, a single current pulse can also provide multiple pairs of oppositely directed stimulations with a configuration of magneto-optical material 72 and conductor 74 as shown in FIGS. 13 Current pulse I traveling in conductor 74 intersects segment 20' of light wave 20 traveling in magneto-optical material 72 at regions $76_A(1)$, $76_B(1)$, $76_A(2)$, $76_B(2)$, $76_A(3)$, $76_B(3)$. Lengths of U-shaped sections of magneto-optical material 72 are adjusted to provide that segment 20' of light wave 20 receives stimulations at each intersection $76_A(1)$, $76_A(2)$, $76_A(3)$ with current pulse I so that rotation of polarization 22 is amplified. In addition effect of lengthy relaxation is cancelled by intersection of segment 20' with current pulse I at each intersection $76_B(1)$, $76_B(2)$, $76_B(3)$.

In addition wavelength transformation can be used to provide a higher amplitude signal taking advantage of the fact that Verdet constant is inversely proportional to wavelength. Continuous light wave 20 may initially have a shorter wavelength than that generally used for optical fiber. This permits a signal to be generated in the magneto-optical material having a larger angle of rotation than would be available if longer wavelength light were used. For example, visible light can be modulated in the present invention. After optical pulse 42 having such a shorter wavelength is generated, as described herein above, parametric amplification or difference frequency generation can be used to transform the light pulse to a longer wavelength light pulse in the range of 1550 nm suitable for optical fiber transmission. This is accomplished by mixing the short wavelength signal with light having a medium wavelength to get a longer wavelength signal suitable for the optical fiber, as described in a book by Bahaa E. A. Saleh, et al, *Fundamentals of Photonics*, John Wiley & Sons, 1991. Depending on the efficiency of this wave length transformation, the result can be more rotated light providing a higher throughput and a higher extinction ratio.

Figure 14:
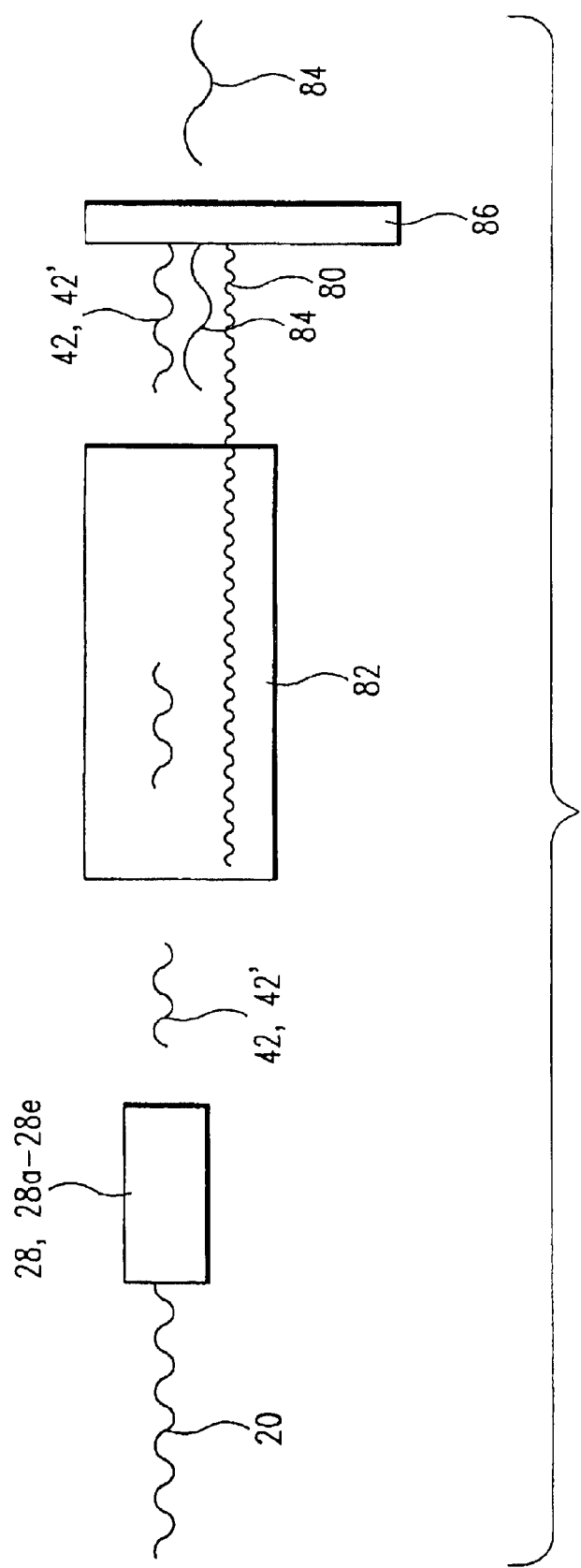
FIG. 14 shows a scheme for providing high amplitude pulses with light of a short wavelength and then converting the wavelength for use in an optical fiber.

Incident light 20 having a wavelength of about 488 nm (argon or diode laser) is modulated in magneto-optical system 28, 28a, 28b, 28c, 28d, 28e to provide radiation pulse 42, 42', as shown in FIG. 14. which is combined with continuous light 80 having a wavelength of about 712 nm in non-linear parametric amplifier material 82 to provide combined light pulse 84 having a wavelength of 1550 nm, suitable for transmission in an optical fiber. Light pulse 42, 42' and continuous light 80 also emerge from non-linear parametric amplifier material 82 but these are removed by filter 86.

Figure 15A:
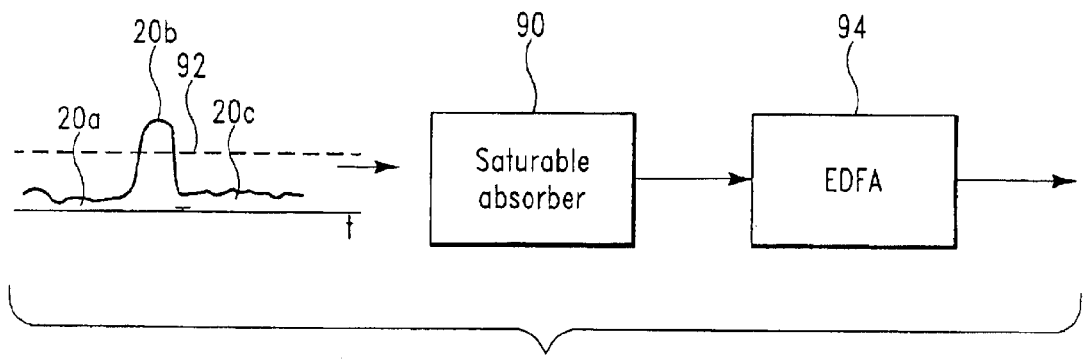
FIGS. 15a–15g shows how a saturable absorber can be used to provide optical data having a high signal to noise ratio.
Figure 15B:
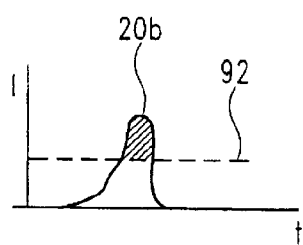
Figure 15C:
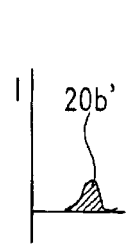
Figure 15D:
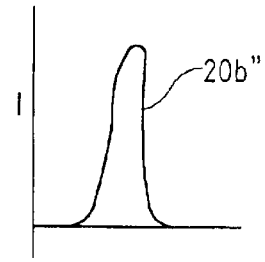
Figure 15E:
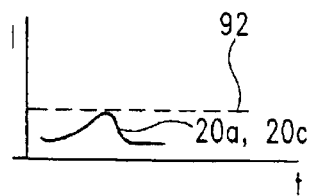
Figure 15F:
Figure 15G:
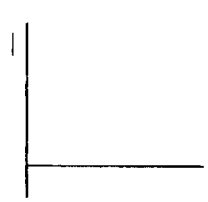

The signal can also be amplified after it penetrates polarizer 26 using an erbium doped fiber amplifier (EDFA) which could provide a 35 dB amplification (about a factor of 3000). However, an EDFA also amplifies off-signal. A saturable absorber, such as InGaAsP, can be used to clip the off-signal. Saturable absorbers include organic dye solutions, semiconductor materials, or multiple quantum wells that block light having intensity below a threshold while permitting a portion of higher intensity light above the threshold to pass, as described in a book, *Lasers,* by Anthony E. Siegman, University Science Books, Mill Valley Calif., 1986. Thus leakage off-signal 20a, 20c may be fully absorbed by saturable absorber 90 without absorbing all of on-signal 20b if the intensity of on-signal 20b is above threshold level 92, as shown in FIGS. 15a–15g. Remaining on-signal 20b' has an intensity about equal to the amount on-signal 20b exceeds threshold level 92. Remaining on-signal 20b' can then be amplified with EDFA 94, providing amplified on signal 20b", as shown in FIG. 15d. By contrast, off-signal 20a, 20c, shown in FIG. 15e as having intensity below threshold level 92, does not penetrate through saturable absorber 90, as shown in FIG. 15f and so no signal emerges from EDFA 94, as shown in FIG. 15g. Thus, off-leakage intensity is substantially reduced or eliminated by passage through saturable absorber 90 while a portion of on-signal passes through saturable absorber 90 and is amplified in EDFA 94. Thus signal to noise ratio is improved.

Figure 16A:
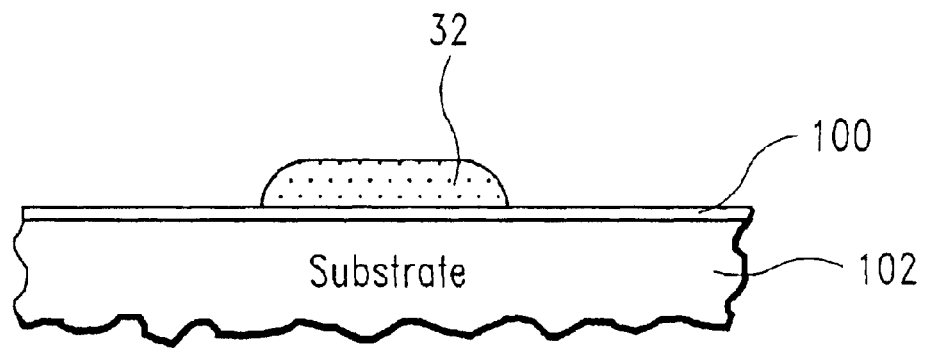
FIGS. 16a, 16c–16e, and 16g show cross sectional views of steps in fabrication of the present invention.
Figure 16B:
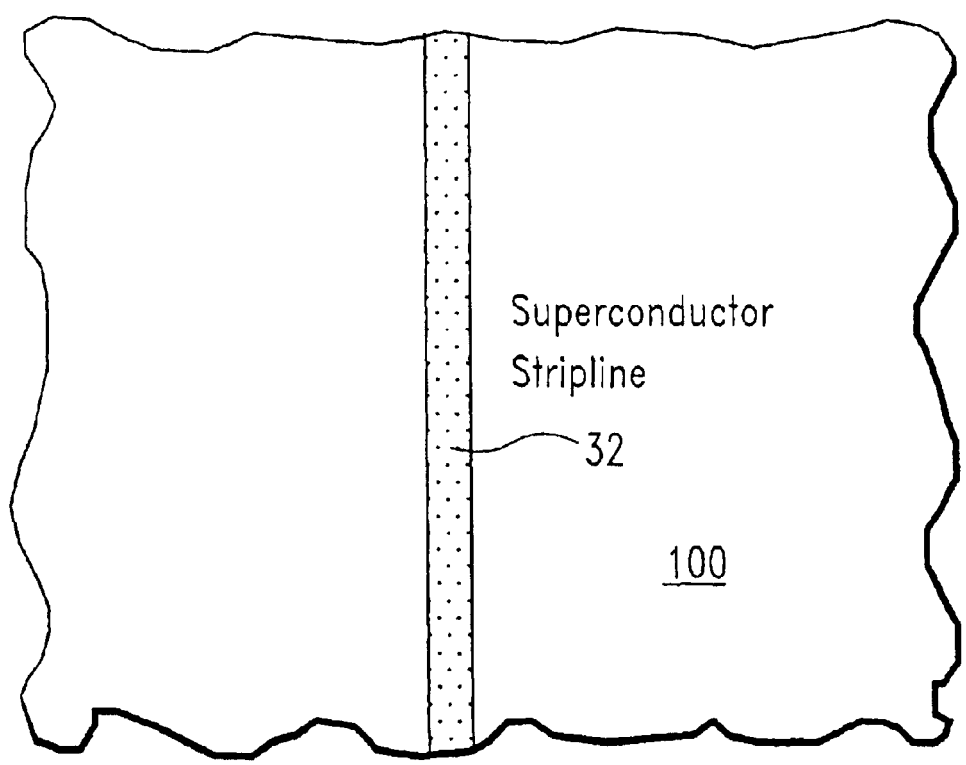
FIGS. 16b and 16f show top views of steps in fabrication of the present invention.

The layered structure of the present invention is fabricated using techniques common to standard superconductor circuit manufacture, which is well known in the art. Using standard photolithography and etch techniques, about a 20 micrometer wide microstripline or electrical conductor 32 is formed from YBCO superconductor, as shown in FIGS. 16a and 16b to carry current pulses $30_A$, $30_B$. Other superconducting circuitry, such as active transmission/amplification line 40, SFQ pulse splitter 41, and SFQ/DC converters 43 are also formed, and microstripline 32 is formed along with these circuits. Alternatively, other superconducting materials, as described herein above, and other substrates such as lanthanum aluminate, strontium titanate, magnesium oxide, can be used.

Figure 16C:
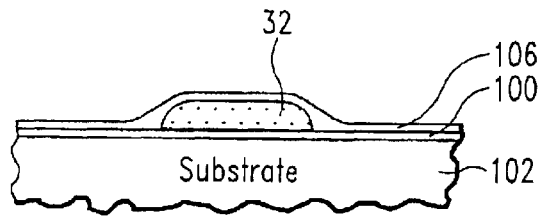
Figure 16D:
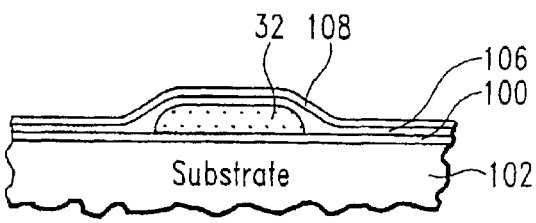
Figure 16E:
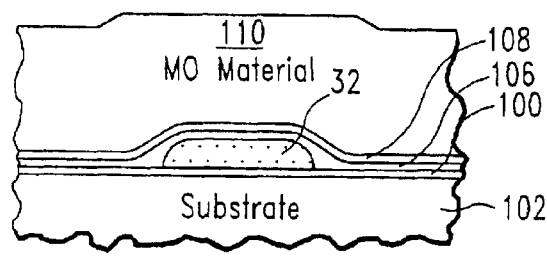
Figure 16G:
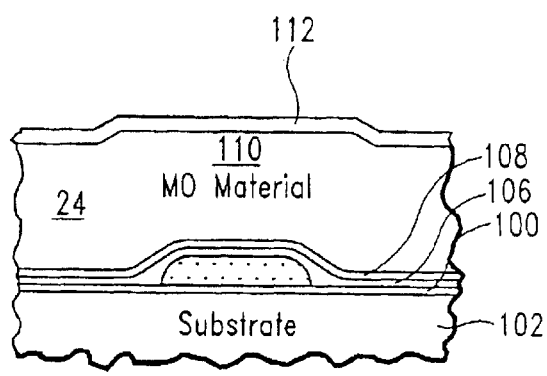
Figure 16F:
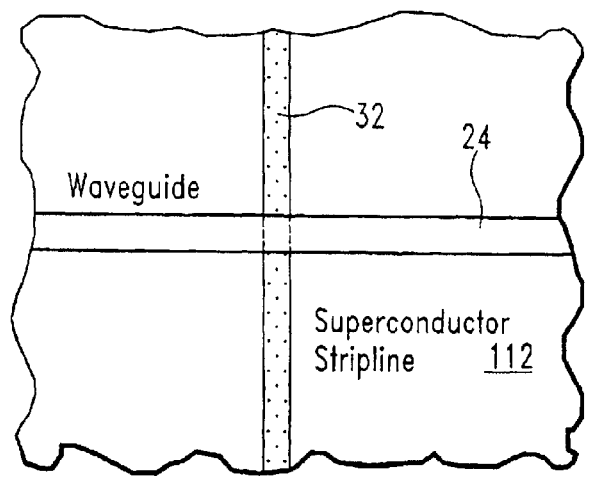

In the next step about 500 Angstroms of YSZ 106 and then about 500 Angstroms of silicon nitride 108 is deposited, as shown in FIGS. 16c, 16d. YSZ is a good diffusion barrier to silicon. Nitride is a good barrier to water and other ionics. Next, about 5 microns of magneto-optical material 110, such as EuSe is deposited and etched to form wave guide 24, as shown in cross sectional view in FIG. 16e and in top view in FIG. 16f, so that waveguide 24 is crossing over superconducting electrical conductor 32. Finally, about a 5000 Angstrom thick layer of gold 112 is deposited over the entire surface to act as a ground plane, as shown in FIG. 16g. Although not shown in FIG. 16b, superconductor 32 or magneto-optical waveguide 24 can be formed in a U shape or other shape described herein above to provide the double stimulation to magneto-optical material 110, 24 as provided in the present invention. Other materials and methods can be used for layers 106, 108, as described in U.S. patent application Ser. No. 09/632,134, incorporated herein by reference.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of generating an electromagnetic signal comprising the steps of:
    a) providing a material;
    b) directing incident radiation at said material, said incident radiation comprising a first parameter having an initial value, said incident radiation comprising a first segment;
    c) providing a first stimulation to said material to provide a first change to said first parameter in said first segment;
    d) providing a second stimulation to said material to provide a second change to said first parameter in said first segment.

2. The method as recited in claim 1, wherein said material comprises a magneto-optical material and said stimulations comprise magnetic stimulations.

3. The method as recited in claim 2, wherein said first parameter comprises polarization angle.

4. The method as recited in claim 2, wherein said magneto-optical material has a time for relaxation, wherein the electromagnetic signal has a pulse width of said first parameter that is less than said time for relaxation.

5. The method as recited in claim 4, wherein in said providing step (d) said second change to said first parameter is opposite said first change.

6. The method as recited in claim 5, wherein the electromagnetic signal comprises an on-portion and an off-portion, said on-portion having radiation experiencing said first stimulation, said off-portion having radiation experiencing a linear combination of said first stimulation and said second stimulation.

7. The method as recited in claim 2, wherein said first parameter has an amplitude equal to a combination of said first change and said second change, wherein said amplitude is greater than said first change.

8. The method as recited in claim 7, wherein said magneto-optical material has a time for relaxation, wherein the electromagnetic signal has a pulse width that is about equal to said time for relaxation.

9. The method as recited in claim 1, wherein said first and said second stimulations are provided by a current pulse in a conductor winding around said material or by a current pulse in a conductor having said material winding around said conductor.

10. The method as recited in claim 1, wherein said first and said second stimulations are provided by a current pulse in a conductor zig zagging across said material or by a current pulse in a conductor having said material zig-zagging across said conductor.

11. A method of generating an electromagnetic signal comprising the steps of:
    a) directing incident radiation at a material, said incident radiation comprising a first parameter having an initial value;
    b) providing a plurality of stimulations to said material to change said value of said first parameter of radiation; and
    c) generating a pulse of radiation from said continuous radiation, said pulse of radiation comprising a second value of said first parameter, said pulse further comprising a pulse width, wherein said pulse width is shorter in time than is achievable with a single one of said plurality of stimulations or said second value is greater than can be achieved with a single one of said plurality of stimulations.

12. The method as recited in claim 11, wherein said second value is greater than can be achieved with a single said stimulation.

13. The method as recited in claim 12, wherein said pulse width is equal to or greater in time than is achievable with a single said stimulation.

14. The method as recited in claim 12, wherein said pulse width is shorter in time than is achievable with a single said stimulation.

15. The method as recited in claim 11, wherein said radiation has a polarization and said first parameter comprises the angle of the polarization of said radiation and wherein said initial value is an initial angle of said polarization.

16. The method as recited in claim 11, wherein said material comprises a magneto-optical material.

17. The method as recited in claim 16, wherein said magneto-optical material comprises a first region and a second region, wherein at least a first portion of said radiation passes through said first region at a first time and at least a second portion of said radiation passes through said second region at a second time.

18. The method as recited in claim 16, wherein said step (b) involves providing one of said plurality of stimulations as a first magnetic field pulse to said first region at said first time to excite a first population of said material into a first excited state, wherein said first population of said material in said first excited state changes said value of said first parameter of said radiation a first amount.

19. The method as recited in claim 18, wherein said first magnetic pulse is provided by a current pulse in a first electrical conductor.

20. A method as recited in claim 19, wherein said first electrical conductor comprises a superconductor.

21. The method as recited in claim 18, wherein said step (b) involves providing a second of said plurality of stimulations as a second magnetic field pulse to said second region at said second time to excite a second population of said material into a second excited state, wherein said second population of said material in said second excited state changes said value of said first parameter of said radiation a second amount.

22. The method as recited in claim 21, wherein said step (b) involves providing a third and a fourth magnetic field pulse to a third and a fourth region of said magneto-optical material to excite a third and a fourth population of said material into said first and said second excited states, respectively, wherein said third population of said material in said first excited state changes said value of said first parameter of said radiation to a third amount higher than said first amount and wherein said fourth population of said material in said second excited state changes said value of said first parameter of said radiation back to said initial value.

23. The method as recited in claim 21, wherein said first and second stimulations are provided so that radiation exiting said magneto-optical material has said value of said first parameter changed by a linear combination of said first amount and said second amount.

24. The method as recited in claim 23, wherein said first and second stimulations are provided so that said second excited state is opposite said first excited state, further wherein radiation exiting said magneto-optical material comprises a first portion having said value of said first parameter changed said first amount and a second portion having said value of said first parameter changed back to said initial value as a result of said combination.

25. The method as recited in claim 24, wherein said first population of said material relaxes back from said first excited state after said first magnetic pulse with a time for said relaxation being longer than time for said excitation.

26. The method as recited in claim 25, wherein said first portion of said radiation exiting said magneto-optical material has a duration that is shorter than said time for excitation plus said time for relaxation.

27. The method as recited in claim 23, further comprising the step of providing a third magnetic field pulse to a third region at a third time to excite a third population of said material into an excited state, wherein said third population of said material changes said first parameter of said radiation a third amount, wherein, said radiation exiting said magneto-optical material has said value of said first parameter increased by said first amount plus said second amount plus said third amount.

28. The method as recited in claim 27, further comprising the step of providing n magnetic field pulses to n regions of said material at n times to excite n populations of said material into an excited state, wherein said n populations of said material change said value of said first parameter of said radiation n amounts so that said radiation exiting said magneto-optical material has said first parameter increased by a sum of said n amounts.

29. The method as recited in claim 21, wherein said first region of said material is in line with said second region of said material so that radiation traveling through said first region stimulated in said first excited state also travels through said second region stimulated in said second excited state.

30. The method as recited in claim 29, further comprising the step of providing third and fourth regions in line with said first and said second regions, wherein said third and fourth regions provide one of (a) said greater second value or said shorter pulse width or (b) both said greater second value and said shorter pulse width.

31. The method as recited in claim 21, wherein said first region of said material is in a first leg of a Mach-Zehnder interferometer and said second region of said material is in a second leg of said Mach-Zehnder interferometer.

32. The method as recited in claim 31, further comprising providing third and fourth regions in a Mach-Zehnder interferometer for providing one of (a) said greater second value or said shorter pulse width or (b) both said greater second value and shorter pulse width.

33. The method as recited in claim 22, where in said pulse of radiation comprises a first part and a second part, said first part comprising radiation traveling through said first region stimulated in said first excited state but not through said second region stimulated in said second excited state, and wherein said second part comprises radiation traveling through said first region stimulated in said first excited state and radiation traveling through said second region stimulated in said second excited state.

34. The method as recited in claim 11, further comprising the step of generating a train of said pulses.

35. The method as recited in claim 11, further comprising the step of directing said pulse through a saturable absorber to absorb residual off-signal.

36. The method as recited in claim 35, wherein said saturable absorber comprises one from the group of organic dye solution, semiconductor material, and quantum wells.

37. The method as recited in claim 35, further comprising the step of amplifying said pulse after said step of directing said pulse through a saturable absorber.

38. The method as recited in claim 37, wherein in said amplifying step comprises directing said pulse through an erbium doped fiber amplifier (EDFA) after said saturable absorber step.

39. The method as recited in claim 11, wherein said incident radiation comprises radiation at a first wavelength, the method further comprising the step of transforming said wavelength to a longer wavelength after said generating step (c).

40. The method as recited in claim 11, further comprising the step of amplifying said pulse after said generating step (c).

41. The method as recited in claim 40, wherein in said amplifying step comprises directing said pulse through an erbium doped fiber amplifier (EDFA).

42. A device, comprising:
  a material for modulating radiation;
  a source of radiation configured to provide radiation to said material, said radiation having a first segment;
  an electrical pulse generator; and
  a plurality of electrical conductors configured to receive pulses from said electrical pulse generator, said conductors extending across different portions of said material, said conductors arranged in a circuit to provide said pulses at said material to intersect said first segment of said radiation.

43. The device as recited in claim 42, wherein said waveguide comprises a magneto-optical material.

44. The device as recited in claim 43, wherein said pulses comprise radiation having a rotated polarization.

45. The device as recited in claim 44, wherein said polarization is rotated through an angle equal to or greater than 45°.

46. The device as recited in claim 42, wherein said electrical conductors comprise superconductors.

47. The device as recited in claim 42, wherein said electrical conductors fold back over said material.

48. The device as recited in claim 42, wherein said source of radiation provides radiation as a continuous wave.

49. The device as recited in claim 42, wherein said circuit to provide said pulses at said material to intersect said first segment comprises a splitter.

50. The device as recited in claim 49, wherein said splitter comprises a single flux quantum pulse splitter.

51. The device as recited in claim 49, further comprising a single flux quantum/direct current converter.

52. The device as recited in claim 42, wherein said circuit to provide said pulses at said material to intersect said first segment comprises delay elements.

53. The device as recited in claim 52, wherein said delay elements comprise additional length of conductor.

54. The device as recited in claim 52, wherein said delay elements comprise electronic devices.

55. The device as recited in claim 42, further comprising a polarizer.

56. The device as recited in claim 55, wherein said polarizer is adjusted to substantially prevent transmission of light when current pulses are not flowing in said electrical conductors.

57. The device as recited in claim 42, wherein said material has a single path.

58. The device as recited in claim 42, wherein said material comprises two paths and each said electrical conductor intersects said two paths.

59. The device as recited in claim 42, wherein said segment comprises a width that is shorter than 100 ps.

60. A device for providing an electromagnetic signal, comprising a magneto-optical material;

a source of radiation configured to provide radiation to said material, said radiation having a first segment, said incident radiation comprising a first parameter having an initial value;

a first conductor for providing a first current pulse for providing a first magnetic stimulation to said material to provide a first change to said first parameter in said first segment;

a second conductor for providing a second current pulse for providing a second magnetic stimulation to said material to provide a second change to said first parameter in said first segment.

61. The device as recited in claim 60, wherein said magneto-optical material comprises one from the group, EuS, $CrBr_3$, EuO, EuSe, $Y_3Fe_3O_{12}$, $CrCl_3$, $Cd_{0.55}Mn_{0.145}Te$, terbium gallium garnet, and $Tb_2Al_5O_{12}$.

62. The device as recited in claim 60, wherein said first and said second conductors comprise superconductors.

63. The device as recited in claim 60, wherein said second conductor comprises a delay element.

* * * * *